(12) United States Patent
Sells

(10) Patent No.: US 8,045,350 B2
(45) Date of Patent: Oct. 25, 2011

(54) N-PHASE ACTIVE BRIDGE CIRCUITS INCLUDING N-CHANNEL FIELD EFFECT TRANSISTORS WITH ACTIVE GATE DRIVE

(75) Inventor: Troy Woodrow Sells, Palm Bay, FL (US)

(73) Assignee: Harris Corporation, Melbourne, FL (US)

(*) Notice: Subject to any disclaimer, the term of this patent is extended or adjusted under 35 U.S.C. 154(b) by 23 days.

(21) Appl. No.: 12/636,034

(22) Filed: Dec. 11, 2009

(65) Prior Publication Data

US 2011/0141782 A1    Jun. 16, 2011

(51) Int. Cl.
*H02M 7/219* (2006.01)
(52) U.S. Cl. .................................. 363/81; 363/127
(58) Field of Classification Search .............. 363/89, 363/127, 44, 52, 61, 81, 84, 125
See application file for complete search history.

(56) References Cited

U.S. PATENT DOCUMENTS

| | | | |
|---|---|---|---|
| 4,139,880 A | 2/1979 | Ulmer et al. | |
| 4,423,456 A | 12/1983 | Zaidenweber | |
| 4,449,176 A | 5/1984 | Turnbull | |
| 4,774,650 A | 9/1988 | Kahkipuro et al. | |
| 4,825,351 A | 4/1989 | Uesugi | |
| 5,268,833 A | 12/1993 | Axer | |
| 5,510,972 A | 4/1996 | Wong | |
| 5,623,550 A | 4/1997 | Killion | |
| 5,648,705 A | 7/1997 | Sitar et al. | |
| 5,793,167 A | 8/1998 | Liang et al. | |
| 5,808,882 A | 9/1998 | Mochikawa | |
| 5,870,031 A | 2/1999 | Kaiser et al. | |
| 5,991,182 A | 11/1999 | Novac et al. | |
| 6,147,545 A | 11/2000 | Marshall | |
| 6,215,271 B1 | 4/2001 | Lerow et al. | |
| 6,353,307 B1 | 3/2002 | Koelle et al. | |
| 6,421,261 B1 | 7/2002 | Fujisawa et al. | |
| 6,549,438 B2 | 4/2003 | Malone | |
| 6,563,726 B1 | 5/2003 | Hirst | |

(Continued)

FOREIGN PATENT DOCUMENTS

EP    1519476    3/2005

(Continued)

OTHER PUBLICATIONS

U.S. Appl. No. 12/567,840, filed Sep. 28, 2009, entitled "Three-Phase Low-Loss Rectifier" to Sells, T.

(Continued)

*Primary Examiner* — Gary L Laxton
(74) *Attorney, Agent, or Firm* — Fox Rothschild, LLP; Robert J. Sacco

(57) ABSTRACT

An n-phase transistor active bridge circuit (BC) connectable between at least two input lines (103, 105, 1051, 1053, 1055) and a pair of output lines (134, 136, 1057, 1059). The BC comprises a plurality of field-effect transistors (FETs) of the same channel type. The FETs (102, 104, 106, 108, 1010, 1012, 1014, 1016, 1018, 1020) are connected to convert an n-phase AC waveform (402, 1102, 1104, 1006) to a DC waveform (502, 1302). The n-phase AC waveform is applied to BC by a voltage source (101, 1002, 1004, 1006) coupled to the input lines. Gate drive circuits (170, 172, 174, 176, 1001a, 1001b, 1001c, 1003a, 1003b, 1003c) supply a voltage to gates (139, 143, 147, 151, 1024, 1034, 1044, 1054, 1064, 1074) of the FETs for switching the FETs to their "on" states or "off" states at predetermined times.

28 Claims, 29 Drawing Sheets

U.S. PATENT DOCUMENTS

| | | |
|---|---|---|
| 6,661,208 B2 | 12/2003 | Rutter et al. |
| 7,084,609 B2 | 8/2006 | Pillote et al. |
| 7,269,038 B2 | 9/2007 | Shekhawat et al. |
| 7,292,445 B2 | 11/2007 | Linke |
| 7,339,804 B2 | 3/2008 | Uchida |
| 7,388,404 B1 | 6/2008 | Miller |
| 7,411,768 B2 | 8/2008 | Sells |
| 7,420,224 B2 | 9/2008 | Milich et al. |
| 7,443,142 B2 | 10/2008 | O'Gorman et al. |
| 7,478,254 B2 | 1/2009 | Kawai |
| 7,561,404 B2 | 7/2009 | Sells |
| 2003/0095423 A1 | 5/2003 | Hirst |
| 2007/0170903 A1 | 7/2007 | Apfel |
| 2007/0171690 A1 | 7/2007 | Apfel |
| 2007/0296363 A1 | 12/2007 | Andrejak et al. |
| 2008/0291699 A1* | 11/2008 | Sells .............................. 363/17 |
| 2009/0273959 A1* | 11/2009 | Sells .............................. 363/127 |
| 2010/0046259 A1 | 2/2010 | Ho et al. |
| 2010/0046264 A1 | 2/2010 | Ho et al. |

FOREIGN PATENT DOCUMENTS

| | | |
|---|---|---|
| WO | WO-97/24795 | 7/1997 |

OTHER PUBLICATIONS

U.S. Appl. No. 12/567,847, filed Sep. 28, 2009, entitled "Three-Phase Low-Loss Rectifier With Active Gate Drive" to Sells, T.
European Search Report mailed May 3, 2011, European Application No. 10015390.7-2207.

* cited by examiner

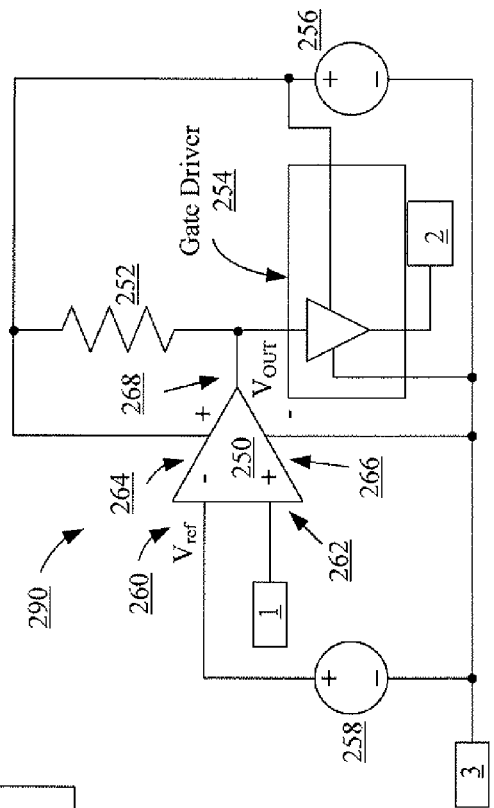
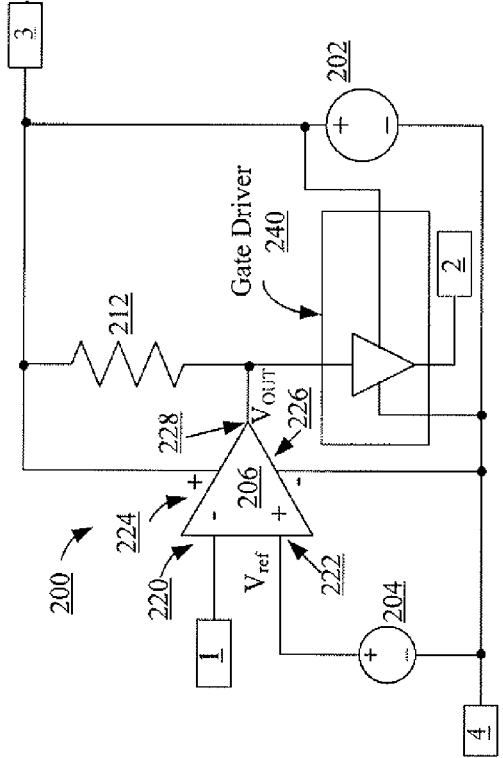
FIG. 2C
FIG. 2D

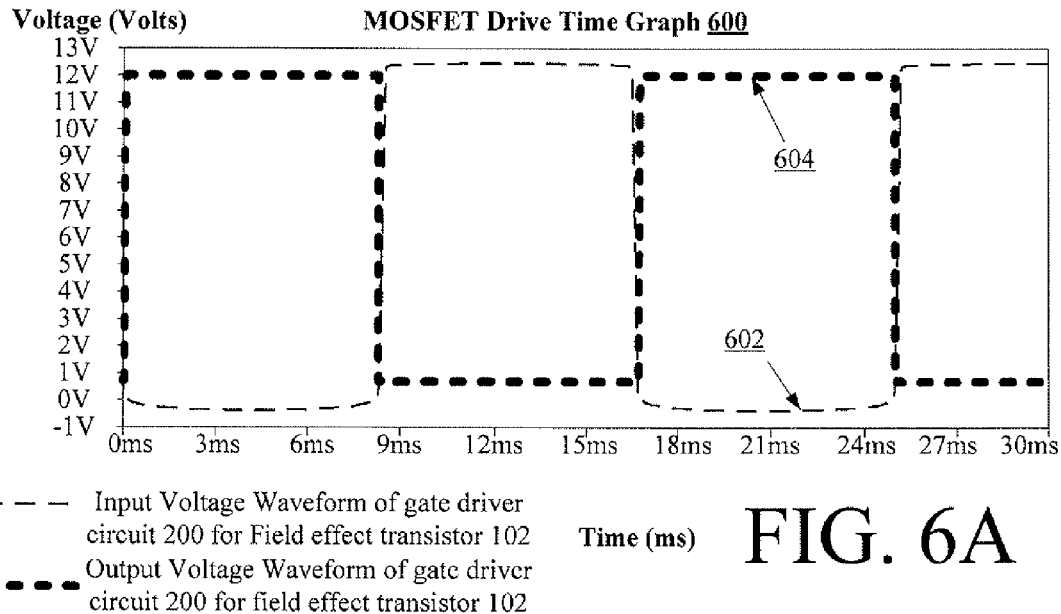
— — — Input Voltage Waveform of gate driver
      circuit 200 for Field effect transistor 102    Time (ms)    FIG. 6A
▪ ▪ ▪ Output Voltage Waveform of gate driver
      circuit 200 for field effect transistor 102
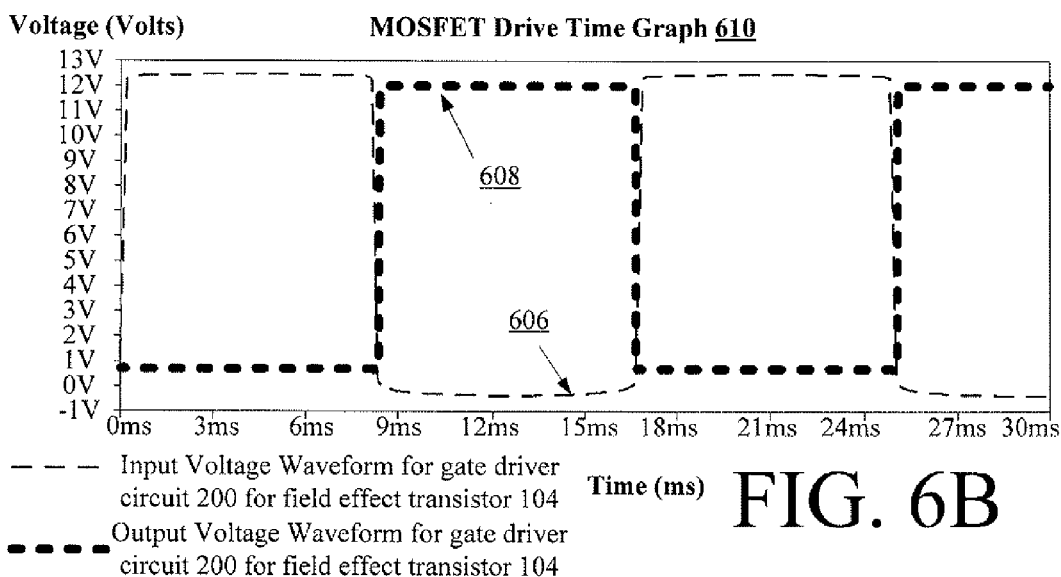
— — — Input Voltage Waveform for gate driver
      circuit 200 for field effect transistor 104    Time (ms)    FIG. 6B
▪ ▪ ▪ Output Voltage Waveform for gate driver
      circuit 200 for field effect transistor 104

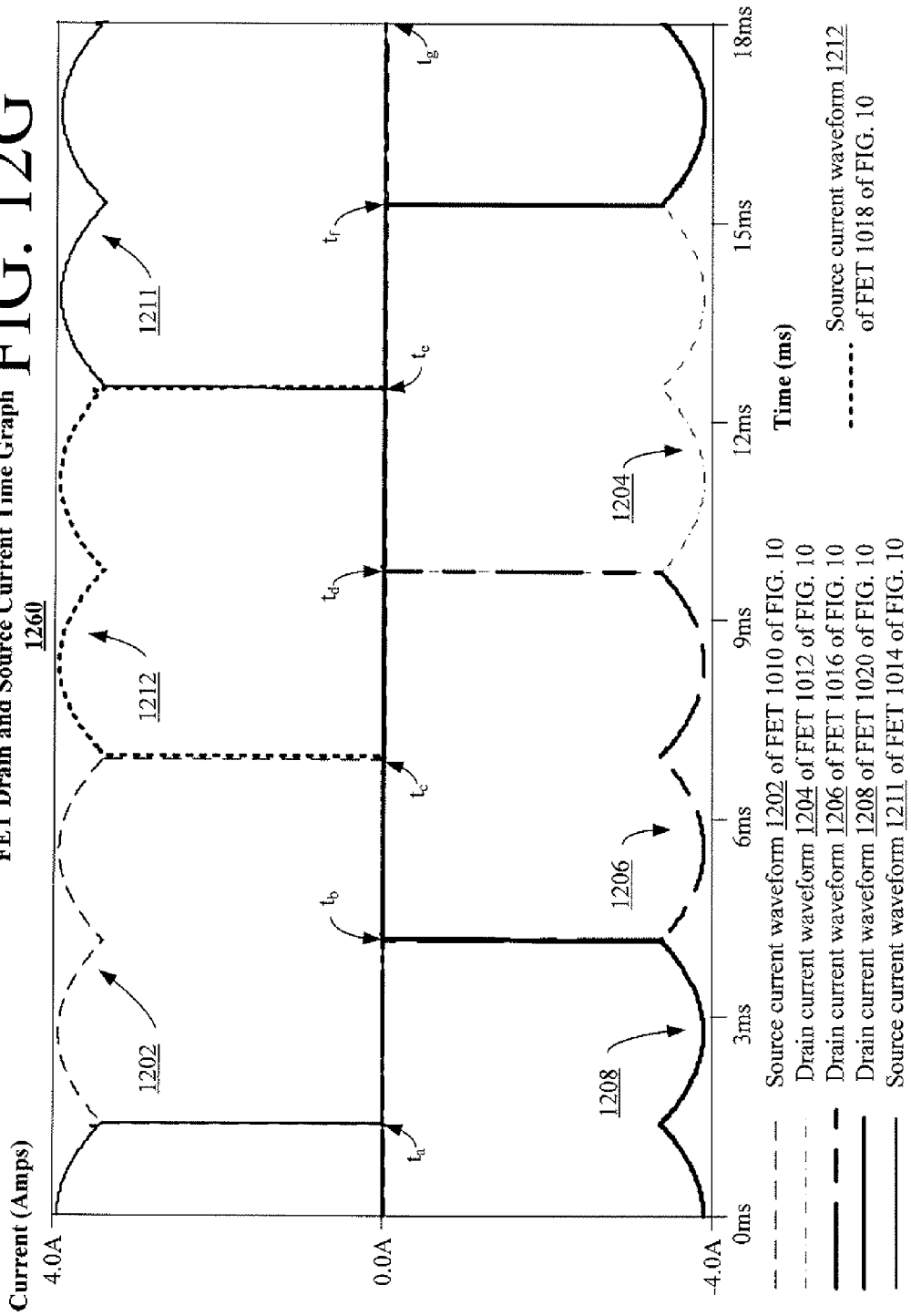

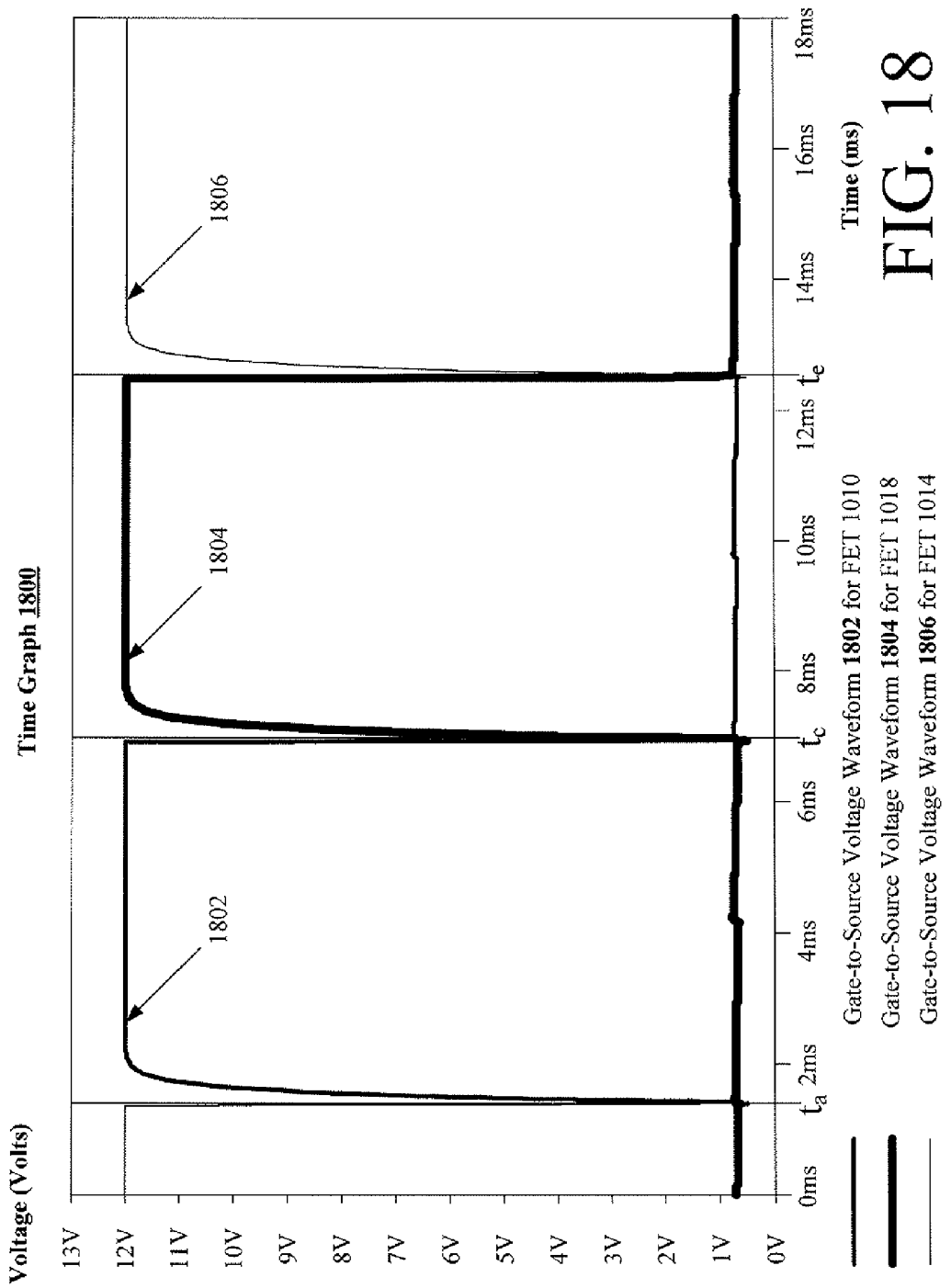

N-PHASE ACTIVE BRIDGE CIRCUITS INCLUDING N-CHANNEL FIELD EFFECT TRANSISTORS WITH ACTIVE GATE DRIVE

BACKGROUND OF THE INVENTION

1. Statement of the Technical Field

The inventive arrangements relate to Metal-Oxide-Semiconductor Field-Effect Transistor (MOSFET) circuits, and more particularly to a circuit for Alternating Current (AC) voltage rectification.

2. Description of the Related Art

Bridge rectifier type devices are typically used to convert an n-phase AC waveform into a Direct Current (DC) waveform. A schematic illustration of a conventional one-phase bridge rectifier type device is shown in FIG. 9 and a conventional three-phase bridge rectifier type device is shown in FIG. 17. As shown in FIG. 9, the conventional one-phase bridge rectifier type device is supplied an AC voltage. The conventional one-phase bridge rectifier type device utilizes a plurality of bridge connected diodes to perform the rectification function. As shown in FIG. 17, the conventional three-phase bridge rectifier type device is supplied three (3) AC voltages that differ in phase by one-third (⅓) of a cycle or one hundred twenty degrees (120°). The one-phase bridge connected diodes include two (2) positive side diodes and two (2) negative side diodes. The conventional three-phase bridge rectifier type device utilizes a plurality of three-phase bridge connected diodes to perform the rectification function. The three-phase bridge connected diodes include three (3) positive side diodes and three (3) negative side diodes. During operation of the one-phase and three-phase bridge rectifier type devices, only those diodes belonging to the phases indicative of peak values of the AC voltages at the respective positive and negative sides are turned on. In effect, an AC waveform is rectified by the bridge rectifier circuit. After the AC waveform is rectified, the output signal is often filtered to remove unwanted spectral content and to produce a DC voltage. A filtering device utilizing capacitor components, resistor components, and/or inductor components is typically used for this purpose.

Despite the various technologies known in the art, there remains a need for a one-phase bridge rectifier type device that can rectify domestic AC mains (for example, 120V, 60 Hz) and/or foreign AC mains (for example, 230V, 50 Hz) with low power loss. There is also a need for a three-phase bridge rectifier type device that can rectify a domestic three-phase AC mains (for example, 208V, 60 Hz) and/or a foreign three-phase AC mains (for example, 400V, 50 Hz) with low power loss.

SUMMARY OF THE INVENTION

Embodiments of the present invention concern n-phase transistor active bridge circuits. Each n-phase transistor active bridge circuit is connectable between at least two input lines and a pair of output lines. The n-phase transistor active bridge circuit comprises a plurality of transistors. For example, if the n-phase transistor active bridge circuit is a one-phase transistor active bridge circuit, then it comprises a first, second, third and fourth field effect transistor. If the n-phase transistor active bridge circuit is a three-phase transistor active bridge circuit, then it comprises a first, second, third, fourth, fifth and sixth field effect transistor. Each of the field effect transistors is of the same channel type.

In the one-phase and three-phase scenarios, a source-drain path of the first field-effect transistor is connected in series with a source-drain path of the second field-effect transistor to form a first series transistor combination. Similarly, a source-drain path of the third field-effect transistor is connected in series with a source-drain path of the fourth field-effect transistor to form a second series transistor combination. In the three-phase scenario, a source-drain path of the fifth field-effect transistor is connected in series with a source-drain path of the sixth field-effect transistor to form a third series transistor combination. The first, second, third, fourth, fifth and sixth field-effect transistors are connected to convert an n-phase AC waveform to a DC waveform. The n-phase AC waveform is applied to the n-phase transistor active bridge circuit by at least one voltage source coupled to the input lines.

A plurality of gate drive circuits are provided for the field effect transistors. Each gate drive circuit is configured to supply a voltage to gates of the field-effect transistors for switching the field-effect transistors to their "on" states or "off" states at predetermined times. Each gate drive circuit has a first terminal coupled to a respective one of a plurality of voltage taps and a second terminal connected to a gate of a respective one of the field-effect transistors. Each gate drive circuit can include a level detector circuit (e.g., a comparator) configured for providing a gate control output signal for each field-effect transistor to selectively switch the field-effect transistor between its "on" state and its "off" state. Each of the gate drive circuits can also include a gate driver device (e.g., a buffer amplifier) excited by the level detector circuit and configured for driving a field-effect transistor by supplying a voltage having an "on state" voltage value to the gate of the field-effect transistor.

According to an aspect of the present invention, a voltage divider circuit is provided for each of the gate drive circuits. Each voltage divider circuit can comprise a first and second resistor. Each voltage tap is defined at a connection point between first and second resistors of a respective one of the voltage divider circuits. A voltage clamping device (e.g., a zener diode) is also provided for each gate driver circuit. Each voltage clamping device provides protection to a respective one of the gate drive circuits. Each voltage clamping device permits a desired voltage level to be developed at a first terminal of the respective gate drive circuit when a voltage across the input lines is less than a predetermined value.

According to another aspect of the present invention, a three-phase transistor active bridge circuits include a plurality of diodes. At least one diode is coupled between a first terminal of a first respective gate drive circuit and a third terminal of a second respective gate drive circuit. At least one diode is connected between a first terminal of a respective gate drive circuit and a respective input line.

BRIEF DESCRIPTION OF THE DRAWINGS

FIG. 2C is a schematic representation of an exemplary gate drive circuit for field-effect transistors.

FIG. 2D is a schematic representation of an exemplary gate drive circuit for field-effect transistors.

FIG. 6A is a MOSFET drive time graph showing a differentially measured voltage waveform supplied to a gate drive circuit of FIG. 2A and a differentially measured output voltage waveform of the gate drive circuit.

FIG. 6B is a MOSFET drive time graph showing a differentially measured voltage waveform supplied to a gate drive circuit of FIG. 2A and a differentially measured output voltage waveform of the gate drive circuit.

FIG. 12G is a time graph showing each of the drain current waveforms shown in FIGS. 12A-12F that is useful for understanding when each field effect transistor of FIG. 10 is switched to its "on" state relative to the other field effect transistors.

FIG. 18 is a time graph showing differentially measured gate-to-source voltage waveforms of field effect transistors shown in FIG. 10.

DETAILED DESCRIPTION

The present invention generally concerns circuits for Alternating Current (AC) voltage rectification. These circuits can include, but are not limited to, one-phase bridge rectifier type devices and three-phase bridge rectifier type devices. The one-phase bridge rectifier type devices will be described below in relation to FIGS. 1-9. The three-phase bridge rectifier type devices will be described below in relation to FIGS. 10-18.

One-Phase Bridge Rectifier

Figure 1:
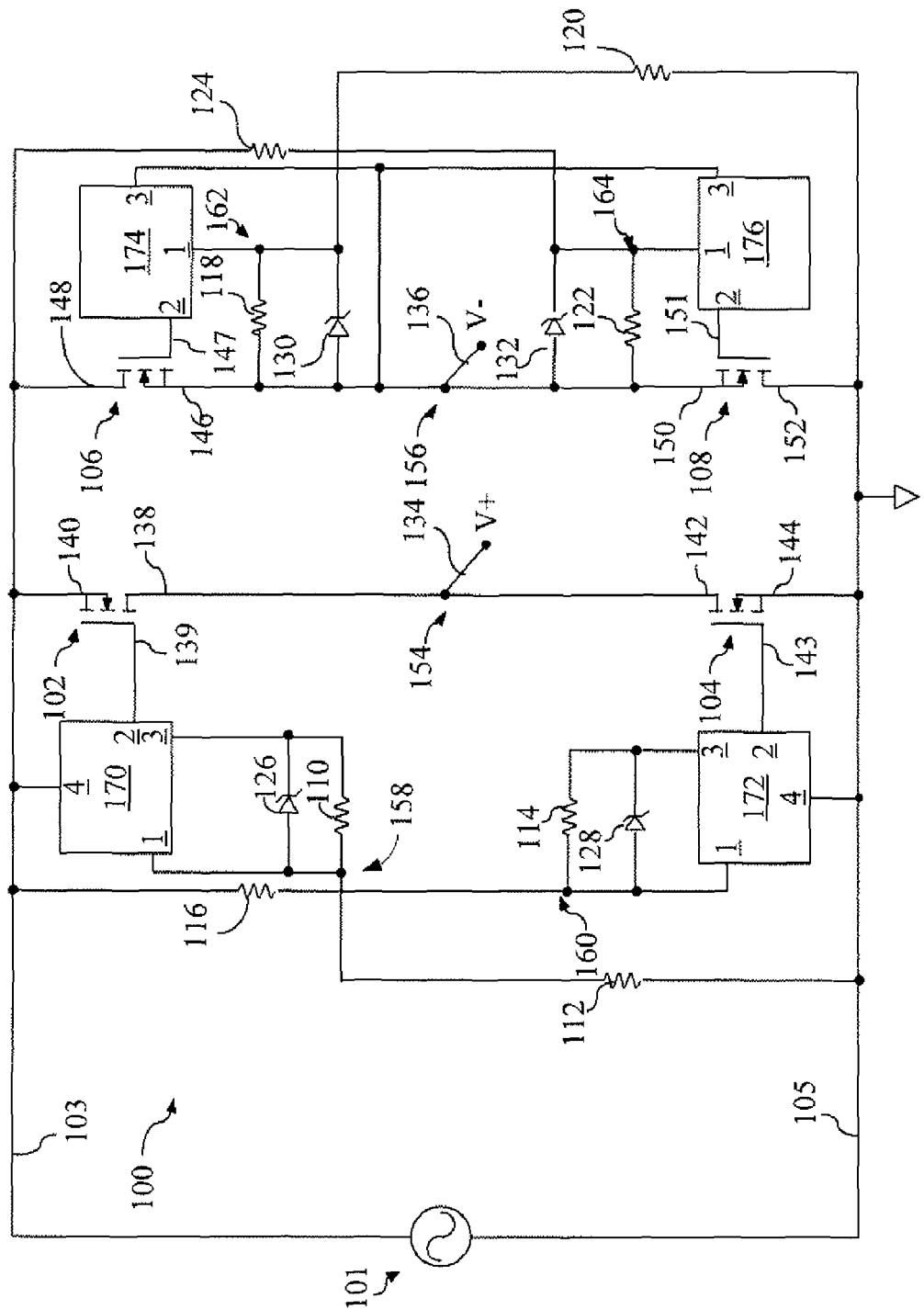
FIG. 1 is a schematic representation of a transistor active bridge circuit with active gate drive.

A one-phase transistor active bridge circuit 100 is shown in FIG. 1. The transistor active bridge circuit 100 shown in FIG. 1 is useful for a variety of purposes, including rectification of domestic AC mains (for example, 120V, 60 Hz) and/or foreign AC mains (for example, 230V, 50 Hz) with low power loss. As may be observed in FIG. 1, the transistor active bridge circuit 100 is supplied an AC voltage waveform. As such, the transistor active bridge circuit 100 is connectable to at least one AC voltage source 101 via two (2) input lines 103, 105. An input voltage time graph 400 showing an exemplary AC input voltage waveform 402 supplied to the transistor active bridge circuit 100 by AC voltage source 101 is provided in FIG. 4. The transistor active bridge circuit 100 is also connected between a pair of output lines 134, 136. The output lines 134, 136 can be connected across a load (not shown) so that the load (not shown) can be supplied a DC output voltage by the transistor active bridge circuit 100. An output voltage time graph 500 showing an exemplary output voltage waveform 502 of the transistor active bridge circuit 100 is provided in FIG. 5.

The transistor active bridge circuit 100 includes a plurality of field-effect transistors 102, 104, 106, 108 of an N-channel type. According to an embodiment of the invention, each of the field-effect transistors 102, 104, 106, 108 are enhancement mode devices. For example the N-channel devices 102, 104, 106, 108 have a part number IRFP4668 available from International Rectifier of El Segundo, Calif. Still, it should be understood that embodiments of the present invention are not limited in this regard. Other types of field-effect transistors can also be selected depending upon the anticipated voltage and current handling requirements of the transistor active bridge circuit 100.

Figure 3:
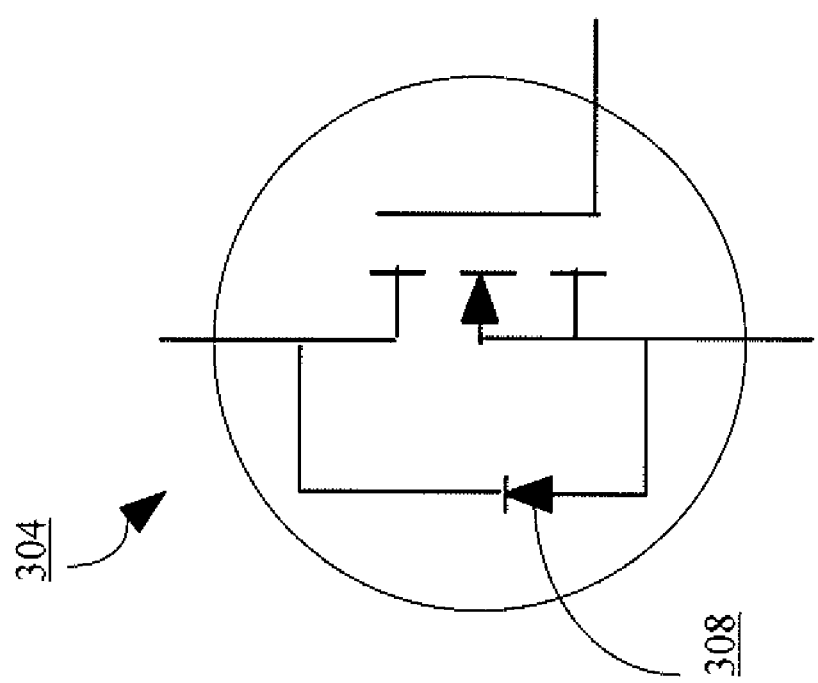
FIG. 3 is a schematic representation of an N-channel MOSFET having an intrinsic body diode.
Figure 4:
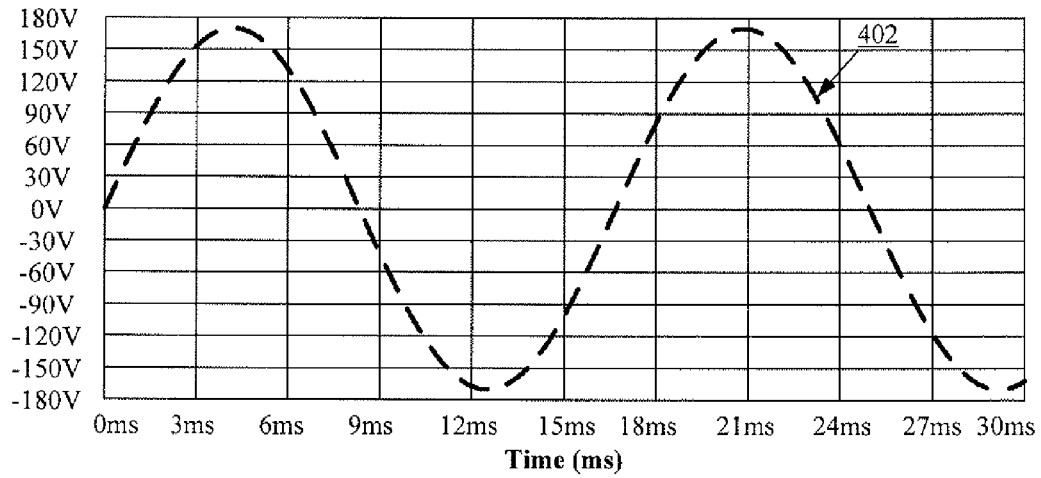
FIG. 4 is an input voltage time graph showing an exemplary input voltage waveform supplied to the transistor active bridge circuit of FIG. 1.
Figure 5:
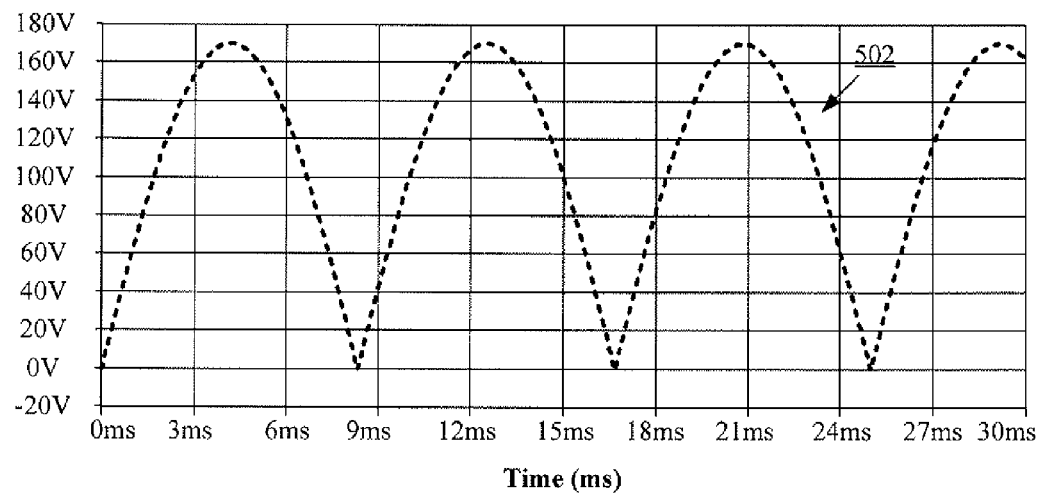
FIG. 5 is an output voltage time graph showing an exemplary output voltage waveform of the transistor active bridge circuit of FIG. 1.

As will be understood by those having ordinary skill in the art, each of the field-effect transistors 102, 104, 106, 108 will have three (3) terminals respectively defined as a source, a gate and a drain. With regard to the field-effect transistor 102, the source, gate and drain terminals are respectively identified with reference numbers 140, 139 and 138. With regard to the field-effect transistor 104, the source, gate and drain terminals are respectively identified with reference numbers 144, 143 and 142. The source, gate and drain terminals of the field-effect transistors 106 and 108 are respectively identified as 146, 147, 148 and 150, 151, 152. An electrical path can be provided from the source to the drain of each field-effect transistor 102, 104, 106, 108. This path is generally referred to herein as the source-drain path. Although not always shown in schematic illustrations, field-effect transistor devices, such as MOSFETs typically have an intrinsic body diode that results from the manner in which the devices are manufactured. This intrinsic body diode 308 is illustrated in FIG. 3 for an N-channel device 304.

Referring again to FIG. 1, it can be observed that a source-drain path of first field-effect transistor 102 is connected in series with a source-drain path of the second field-effect transistor 104. The series connected transistor pair 102, 104 form a first series transistor combination that is connected across the input lines 103, 105. A source-drain path of the third field-effect transistor 106 is connected in series with a source-drain path of the fourth field-effect transistor 108 to form a second series transistor combination connected across the input lines 103, 105.

The transistor active bridge circuit 100 can have an output defined by output lines 134, 136. A first one of the output lines 134 can be connected to the first series combination 102, 104 at an interconnection point 154 between the first and the second field-effect transistors 102, 104. A second one of the output lines 136 can be connected to the second series combination 106, 108 at an interconnection point 156 between the third and fourth field-effect transistors 106, 108.

A gate driver circuit 170, 172, 174, 176 is provided for each field-effect transistor 102, 104, 106, 108. A terminal 1 of each gate driver circuit 170, 172, 174, 176 is connected to a respective voltage tap (described below). A terminal 2 of each gate driver circuit 170, 172, 174, 176 is connected to a gate 139, 143, 147, 151 of a respective field-effect transistor 102, 104, 106, 108. A terminal 3 of each gate driver circuit 170, 172 is connected to a respective voltage divider circuit (described below). A terminal 3 of each gate driver circuit 174, 176 is connected to the interconnection point 156 between the third and fourth field-effect transistors 106, 108. A terminal 4 of each gate driver circuit 170, 172 is connected to respective one of the input lines 103, 105.

Each gate driver circuit 170, 172, 174, 176 is generally configured to supply a voltage to the gate 139, 143, 147, 151 of a respective field-effect transistor 102, 104, 106, 108 at certain times for switching the field-effect transistor to its "on" state or "off" state. The voltage applied to the gate 139, 143, 147, 151 of a respective field-effect transistor 102, 104, 106, 108 has an "on state" or "off state" voltage value selected in accordance with a particular field-effect transistor 102, 104, 106, 108 application. Each gate driver circuit 170, 172, 174, 176 is also generally configured to stop supplying the voltage to the gate 139, 143, 147, 151 of a respective field-effect transistor 102, 104, 106, 108 at certain times for switching the field-effect transistor to its "on" state or "off" state. An exemplary embodiment of the gate driver circuits 170, 172 will be described in detail below in relation to FIGS. 2A and 2C. Similarly, an exemplary embodiment of the gate driver circuits 174, 176 will be described in detail below in relation to FIGS. 2B and 2D.

The transistor active bridge circuit 100 further includes a plurality of devices for ensuring that each of the field-effect transistors 102, 104, 106, 108 is switched to its "on" states and/or "off" states at desirable times. These devices can include, but are not limited to, voltage divider circuits. According to embodiments of the present invention, each of the voltage divider circuits can be comprised of a first resistor and a second resistor connected in series. However, embodiments of the present invention are not limited in this regard. Instead, those having ordinary skill in the art will appreciate that numerous different types of voltage dividers circuits are possible and can be used for the purposes as hereinafter described. The voltage divider circuit for the first field-effect transistor 102 can include first resistor 110 and second resistor 112. The voltage divider circuit for the second field-effect transistor 104 can include first resistor 114 and a second resistor 116. Similarly, the voltage divider circuit for the third and fourth field-effect transistors 106, 108 can include first resistors 118, 122 and second resistors 120, 124.

In FIG. 1, the first and second resistors of the field effect transistors 102, 104 are connected in series from a terminal 3 of gate driver circuit 170, 172 to one of the input lines 103, 105. For example, the resistor combination 110, 112 is connected to terminal 3 of gate driver circuit 170 to input line 105. The resistor combination 114, 116 is connected to terminal 3 of gate driver circuit 172 to input line 103. In contrast, the first and second resistors of the field effect transistors 106, 108 are connected in series from a source 146, 150 of the respective field effect transistors 106, 108 to one of the input lines 103, 105. For example, the resistor combination 118, 120 is connected to the source 146 of field effect transistors 106 to input line 105. The resistor combination 122, 124 is connected to the source of field effect transistors 108 to input line 103.

Each voltage divider advantageously provides a voltage tap 158, 160, 162, 164. For example, if a resistive voltage divider is used as shown in FIG. 1, then the voltage tap can be provided at a connection point between the first and second resistors. The voltage tap 158, 160, 162, 164 of each voltage divider circuit is connected to a terminal 1 of a respective one of the gate drive circuits 170, 172, 174, 176. Consequently, the voltage tap 158, 160, 162, 164 advantageously provides a substantially reduced voltage output relative to the input voltage applied to the voltage divider circuit by AC voltage source 101. For example, the voltage tap 158, 160, 162, 164 of a voltage divider circuit 110/112, 114/116, 118/120, 122/124 can provide an output that is reduced by ten percent (10%) to ninety percent (90%) relative to the input voltage.

Notably, embodiments of the present invention are not limited to any particular range of voltage reduction by the voltage divider circuit 110/112, 114/116, 118/120, 122/124. The purpose of the voltage divider circuits 110/112, 114/116, 118/120, 122/124 is to permit a relatively larger range of input voltages to be applied across input lines 103, 105 without producing excessively high voltage levels at a terminal 1 of each gate drive circuit 170, 172, 174, 176. However, the voltage divider circuits 110/112, 114/116, 118/120, 122/124 should still produce a voltage at a terminal 1 of each gate drive circuit 170, 172, 174, 176 that is of sufficient magnitude to indicate when a respective field-effect transistor 102, 104, 106, 108 is to be switched to its "on" state or its "off" state. For example, the first resistors 110, 114, 118, 122 can be selected to be about one hundred kilo Ohms (100 kΩ). The second resistors 112, 116 can be selected to be about ten kilo Ohms (10 kΩ). The second resistors 120, 124 can be selected to be about fifty kilo Ohms (50 kΩ). Still, those having ordinary skill in the art will appreciate that the present invention is not limited in this regard. A variety of other voltage divider values can and should be used depending upon the design criteria for input voltage range, current draw, and transistor specifications.

The optional voltage clamping circuits 126, 128, 130, 132 can be provided to ensure that the voltage applied to the input terminals 1 of the gate drive circuits 170, 172, 174, 176 do not become excessively large as the AC input voltage is increased. Any suitable voltage clamping circuit can be used for this purpose. For example, each of the voltage clamping circuits 126, 128 could be simply implemented as a zener diode that is connected in parallel with first resistor 110, 114 between terminals 3 and 1 of a respective gate drive circuit 170, 172. The zener diodes 126, 128 can ensure that the voltages between terminals 3 and 1 of a respective gate drive circuit 170, 172 are limited. For example, the zener diodes 126, 128 can prevent the voltages between terminals 3 and 1 of a respective gate drive circuit 170, 172 from exceeding a predetermined threshold voltage defined by the reverse breakdown voltage of the zener diodes 126, 128.

Each of the voltage clamping circuits 130, 132 could be simply implemented as a zener diode that is connected in parallel with first resistor 118, 122 between a terminal 1 of a respective gate drive circuit 174, 176 and a source 146, 150 of a respective field-effect transistor 106, 108. The zener diodes 130, 132 can ensure that the voltages between the inputs terminals 1 of the gate drive circuits 174, 176 and source terminals 146, 150 of the field-effect transistors 106, 108 are limited. For example, the zener diodes 130, 132 can prevent the voltages between the inputs terminals 1 of the gate drive circuits 174, 176 and the source terminals 146, 150 of the field-effect transistors 106, 108 from exceeding a predetermined threshold voltage defined by the reverse breakdown voltage of the zener diodes 130, 132.

A further advantage of using a voltage clamping circuit 126, 128 as described herein is it allows an adequate voltage level to be developed between terminals 3 and 1 of a respective gate drive circuit 170, 172, even with relatively low input AC voltages across lines 103, 105. Similarly, each of the voltage clamping circuits 130, 132 allows an adequate voltage level to be developed between terminal 1 of a respective gate drive circuit 174, 176 and the source 146, 150 of a respective field-effect transistor 106, 108, even with relatively low input AC voltages across lines 103, 105. For example, each of the voltage divider circuits 110/112, 114/116, 118/120, 122/124 can be designed to allow a relatively large proportion of the input AC voltage (e.g., 70%) to appear at the respective voltage tap 158, 160, 162, 164. The larger proportion of voltage ensures that the gate drive circuits 170, 172, 174, 176 will selectively switch the field-effect transistors 102, 104, 106, 108 to their "on" states or "off" states, even with relatively low input voltages from AC voltage source 101. In order to ensure that this larger proportion of voltage does not damage the gate drive circuits 170, 172, 174, 176 when considerably higher input voltages are applied to the transistor active bridge circuit 100, the clamping circuit 126, 128, 130, 132 can clamp the output of the voltage divider circuit 110/112, 114/116, 118/120, 122/124 at a predetermined level.

Figure 2B:
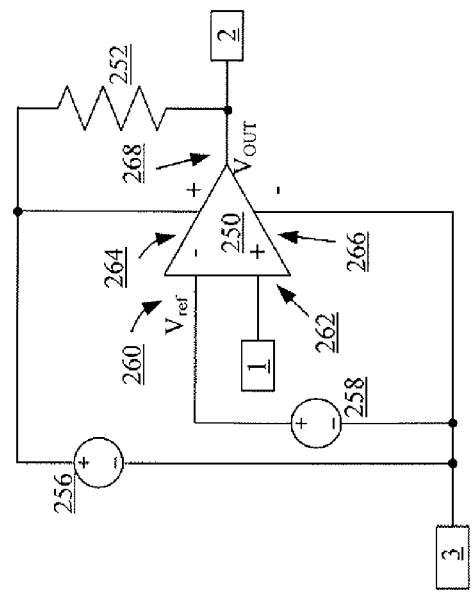
FIG. 2B is a schematic representation of an exemplary gate drive circuit for field-effect transistors.
Figure 2A:
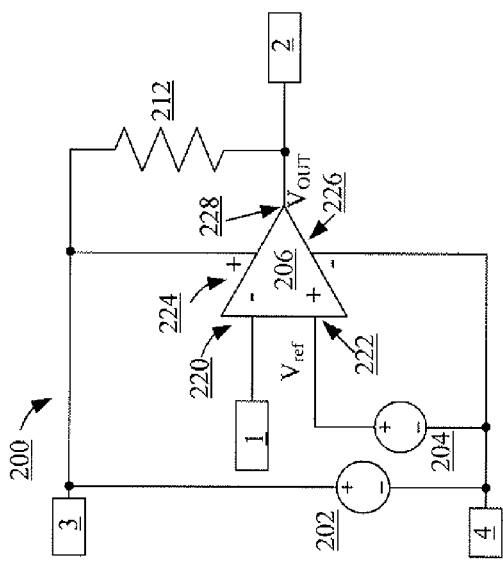
FIG. 2A is a schematic representation of an exemplary gate drive circuit for field-effect transistors.

Referring now to FIG. 2A, there is provided a schematic illustration of an exemplary embodiment of the gate drive circuit 200 for N-channel field-effect transistors. Gate drive circuits 170, 172 of FIG. 1 can be the same as or substantially similar to the gate drive circuit 200. As such, the following description of the gate drive circuit 200 is sufficient for understanding the gate drive circuits 170, 172 of FIG. 1.

As shown in FIG. 2A, the gate drive circuit 200 includes a level detector circuit 206 and a resistor 212. The level detector circuit 206 is preferably a comparator circuit (for example, an open loop polarity indicator). Still, embodiments of the present invention are not limited in this regard. The level detector circuit 206 can be comprised of any voltage comparator circuit known in the art, provided that it has suitable specifications for a particular transistor active bridge circuit application.

Referring again to FIG. 2A, the level detector circuit 206 is comprised of an inverting input terminal 220, a non-inverting input terminal 222, a positive power supply terminal 224, a negative power supply terminal 226 and an output terminal 228. The inverting input terminal 220 is electrically coupled to a voltage tap (e.g., voltage taps 158, 160 shown in FIG. 1) of a voltage divider circuit (e.g., the voltage divider circuit 110/112 shown in FIG. 1). The non-inverting input terminal 222 is electrically coupled to a reference voltage source 204. The reference voltage source 204 supplies a reference voltage ($V_{ref}$) to the level detector circuit 206. The reference voltage $V_{ref}$ can be selected to have any value in accordance with a particular transistor active bridge circuit application.

As shown in FIG. 2A, the positive power supply terminal 224 is coupled to a positive terminal of a power supply 202. The negative power supply terminal 226 is coupled to a negative terminal of the power supply 202. As such, an input power supply voltage (e.g., 12 Volts) is coupled directly across the positive power supply terminal 224 and the negative power supply terminal 226 of the level detector circuit 206. The output voltage ($V_{OUT}$) of the level detector circuit 206 is forced to either the level detector circuit's positive saturation level or negative saturation level. For example, if a voltage at the non-inverting input terminal 222 is more positive than a voltage of the inverting input terminal 220, then the output voltage $V_{OUT}$ is forced to the level detector circuit's positive saturation level (i.e., the value of the input power supply voltage). Alternatively, if a voltage at the non-inverting input terminal 222 is less positive than a voltage at the inverting input terminal 220, then the output voltage $V_{OUT}$ is forced to the level detector circuit's negative saturation level.

The output voltage $V_{OUT}$ of the gate drive circuit 200 is communicated from the level detector circuit 206 to the gate (e.g., gate 139 shown in FIG. 1) of an N-channel field-effect transistor (e.g., the field-effect transistor 102 shown in FIG. 1). If the output voltage $V_{OUT}$ is forced to the level detector circuit's positive saturation level, then the N-channel field-effect transistor (e.g., the field-effect transistor 102 shown in FIG. 1) is switched to its "on" state. In contrast, if the output voltage $V_{OUT}$ is forced to the level detector circuit's negative saturation level, then the N-channel field-effect transistor (e.g., the field-effect transistor 102 shown in FIG. 1) is switched to its "off" state.

It should be understood that the gate drive circuit 200 is not limited to the embodiment shown in FIG. 2A. For example, the gate drive circuit 200 can further include a gate driver 240 shown in FIG. 2C between terminal 228 of the level detector circuit 206 and the terminal 2 of the gate drive circuit 200. Gate drivers are well known to those having ordinary skill in the art, and therefore will not be described in detail herein. However, it should be understood that the gate driver 240 is generally configured to drive the N-channel first field-effect transistor (e.g., the field-effect transistor 102 shown in FIG. 1) in "on/off" state switching applications by supplying a voltage having an "on state" or an "off state" voltage value to the gate (e.g., gate 139 shown in FIG. 1) of the field-effect transistor (e.g., the field-effect transistor 102 shown in FIG. 1). According to embodiments of the present invention, the gate driver 240 can include, but is not limited to, a gate driver having a part number FAN3122 available from Fairchild Semiconductor Corporation of San Jose, Calif.

N-channel MOSFET drive time graphs 600, 610 are provided in FIGS. 6A and 6B that show exemplary input voltage waveforms 602, 606 supplied to the terminal 1 of the gate drive circuit 200 and exemplary output waveforms 604, 608 of the gate drive circuit 200. Notably, the voltage waveforms 602, 604, 606, 608 are not measured with respect to ground. Instead, the voltage waveforms 602, 604, 606, 608 are measured differentially between the input terminal 220 and the negative power supply terminal 226 of the gate drive circuit 200. The gate drive circuit 200 advantageously provides a transistor active bridge circuit 100 with decreased MOSFET 102, 104 turn "on" and "off" times.

Referring now to FIG. 2B, there is provided a schematic illustration of an exemplary embodiment of the gate drive circuit 290 for N-channel field-effect transistors. Gate drive circuits 174, 176 of FIG. 1 can be the same as or substantially similar to the gate drive circuit 290. As such, the following discussion of the gate drive circuit 290 is sufficient for understanding the gate drive circuits 174, 176 of FIG. 1.

As shown in FIG. 2B, the gate drive circuit 290 includes a level detector circuit 250 and a resistor 252. The level detector circuit 250 is preferably a comparator circuit (for example, an open loop polarity indicator). Still, embodiments of the present invention are not limited in this regard. The level detector circuit 250 can be comprised of any voltage comparator circuit known in the art, provided that it has suitable specifications for a particular bridge rectifier application. The level detector circuit 250 can be the same as or substantially similar to the level detector circuit 206 of FIG. 2A. As such, the description of the level detector circuit 206 provided above in relation to FIG. 2A is sufficient for understanding the level detector circuit 250.

It should also be understood that the level detector circuit 250 is comprised of an inverting input terminal 260, a non-inverting input terminal 262, a positive power supply terminal 264, a negative power supply terminal 266 and an output terminal 268. The inverting input terminal 260 is electrically coupled to a reference voltage source 258. The reference voltage source 258 is configured to supply a reference voltage ($V_{ref}$) to the level detector circuit 250. The reference voltage $V_{ref}$ can be selected to have any value (e.g., 5 Volts) in accordance with a particular bridge rectifier application. The non-inverting input terminal 262 is electrically coupled to a voltage tap (e.g., the voltage tap 162 shown in FIG. 1) of the voltage divider circuit (e.g., the voltage divider circuit 118/120 shown in FIG. 1). The positive power supply terminal 264 is coupled to a positive terminal of a power supply 256. The negative power supply terminal 266 is coupled to a negative terminal of the power supply 256. As such, an input power supply voltage (e.g., 12 Volts) is coupled directly across the positive power supply terminal 264 and the negative power supply terminal 266 of the level detector circuit 250.

The output voltage ($V_{OUT}$) of the level detector circuit 250 is forced to either the level detector circuit's positive saturation level or negative saturation level based on whether the voltage at the non-inverting input terminal 262 is more or less positive than the reference voltage $V_{ref}$. If the output voltage $V_{OUT}$ is forced to the level detector circuit's positive saturation level, then the N-channel field-effect transistor (e.g., the field-effect transistor 106 shown in FIG. 1) is switched to its "on" state. In contrast, if the output voltage $V_{OUT}$ is forced to the level detector circuit's negative saturation level, then the N-channel field-effect transistor (e.g., the field-effect transistor 106 shown in FIG. 1) is switched to its "off" state.

It should be understood that the gate drive circuit 290 is not limited to the embodiment shown in FIG. 2B. For example, the gate drive circuit 290 can further include a gate driver 254 shown in FIG. 2D between terminal 268 of the level detector circuit 250 and the terminal 2 of the gate drive circuit 290. Gate drivers are well known to those having ordinary skill in the art, and therefore will not be described in detail herein. However, it should be understood that the gate driver 254 shown in FIG. 2D is generally configured to drive the N-channel first field-effect transistor (e.g., the field-effect transistor 106 shown in FIG. 1) in "on/off" state switching applications by supplying a voltage having an "on state" or an "off state" voltage value to the gate (e.g., gate 147 shown in FIG. 1) of the field-effect transistor (e.g., the field-effect transistor 106 shown in FIG. 1). According to embodiments of the present invention, the gate driver 254 shown in FIG. 2D can include, but is not limited to, a buffer amplifier or a gate driver having a part number FAN3122 available from Fairchild Semiconductor Corporation of San Jose, Calif.

Figure 7A:
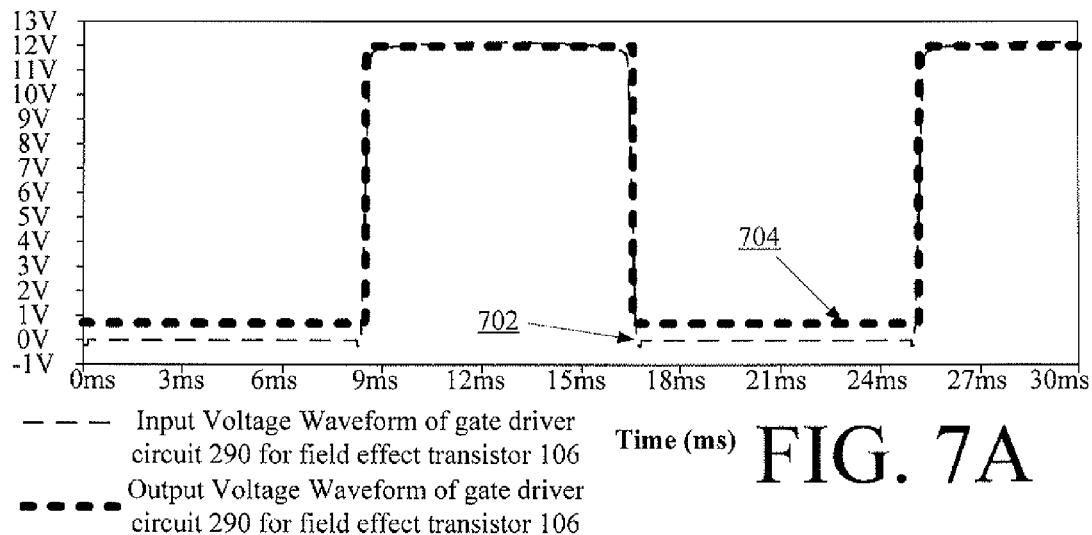
FIG. 7A is a MOSFET drive time graph showing a ground-referenced voltage waveform supplied to a gate drive circuit of FIG. 2B and a ground-referenced output voltage waveform of the gate drive circuit.
Figure 7B:
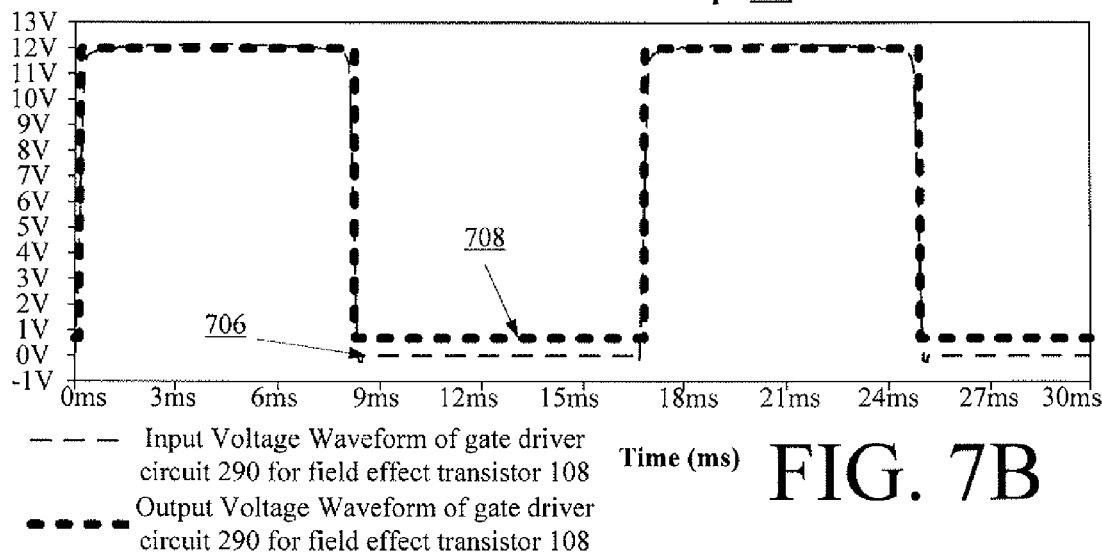
FIG. 7B is a MOSFET drive time graph showing a ground-referenced voltage waveform supplied to a gate drive circuit of FIG. 2B and a ground-referenced output voltage waveform of the gate drive circuit.

N-channel MOSFET drive time graphs 700, 710 are provided in FIGS. 7A-7B that show exemplary input voltage waveforms 702, 706 supplied to the terminal 1 of the gate drive circuit 290 and exemplary output waveforms 704, 708 of the gate drive circuit 290. Notably, the voltage waveforms 702, 704, 706, 708 are not measured with respect to ground. Instead, the voltage waveforms 702, 704, 706, 708 are measured differentially from a signal of interest to the negative power supply terminal 266 of the gate drive circuit 290. The gate drive circuit 290 advantageously provides a transistor active bridge circuit 100 with decreased N-channel MOSFET 106, 108 turn "on" and "off" times.

The operation of the transistor active bridge circuit 100 will now be described in detail. When input line 103 is positive relative to input line 105, an intrinsic body diode associated with each of the field-effect transistors 102 and 108 will be forward biased and current will begin to flow between the source 140, 150 and drain 138, 152 of these field-effect transistors 102, 108. Thereafter, the gate drive circuits 170, 176 communicate a gate control output signal to the field-effect transistor 102, 108 for biasing the field-effect transistors 102, 108, thereby switching the field-effect transistors 102, 108 to their "on" states. In this regard, it should be understood that each of the field-effect transistors are switched to their "on" states when a gate-to-source voltage $V_{gs}$ is greater than a threshold gate-to-source voltage $V_{gs\_th}$.

When switched to their "on" states, a relatively low resistance path is created between source 140, 150 and drain 138, 152 of each field-effect transistor 102, 108. The exact amount of this resistance will depend upon several factors, including the specified drain-to-source on state resistance of the field-effect transistors 102, 108. For example "on" state resistance values of between five tenths of a milli Ohm (0.5 mΩ) and ten Ohms (10Ω) are typical for such field-effect transistor devices. Once turned on, however, current will continue to flow between the source 140, 150 and drain 138, 152 of the field-effect transistors 102, 108 through the low resistance path, thereby eliminating the voltage drop associated with the body diode 308. Consequently, if a load is connected across output lines 134, 136, then the voltage drop caused by the transistor active bridge circuit 100 can be considerably less than the typical diode drop associated with a conventional diode bridge circuit (e.g., circuit 900 shown in FIG. 9). In this regard, it may be noted that in a conventional diode bridge circuit (e.g., circuit 900 shown in FIG. 9), the output voltage drop will include two (2) diode drops. Accordingly, the voltage drop in a conventional diode bridge (e.g., circuit 900 shown in FIG. 9) can be in the range from one and two tenths of a Volt (1.2 V) to one and six tenths of a Volt (1.6 V). Embodiments of the present invention are not limited in this regard. For example, the voltage drop in a conventional diode bridge (e.g., circuit 900 shown in FIG. 9) can be in the range larger than that recited above.

If the input voltage applied across input lines 103, 105 is sufficiently high, it will exceed a reverse breakdown voltage of zener diodes 126, 132. This will cause the zener diode 126 to clamp the voltage applied between the input terminals 3 and 1 of the gate drive circuit 170. This will also cause the zener diode 132 to clamp the voltage applied between the terminal 1 of the gate drive circuit 176 and the source terminal 150 of each field-effect transistor 108. When the input voltage polarity is reversed, field-effect transistors 102, 108 will be switched to their "off" states, and the field-effect transistors 104, 106 will be switched to their "on" states in a manner similar to that described above.

Figure 8A:
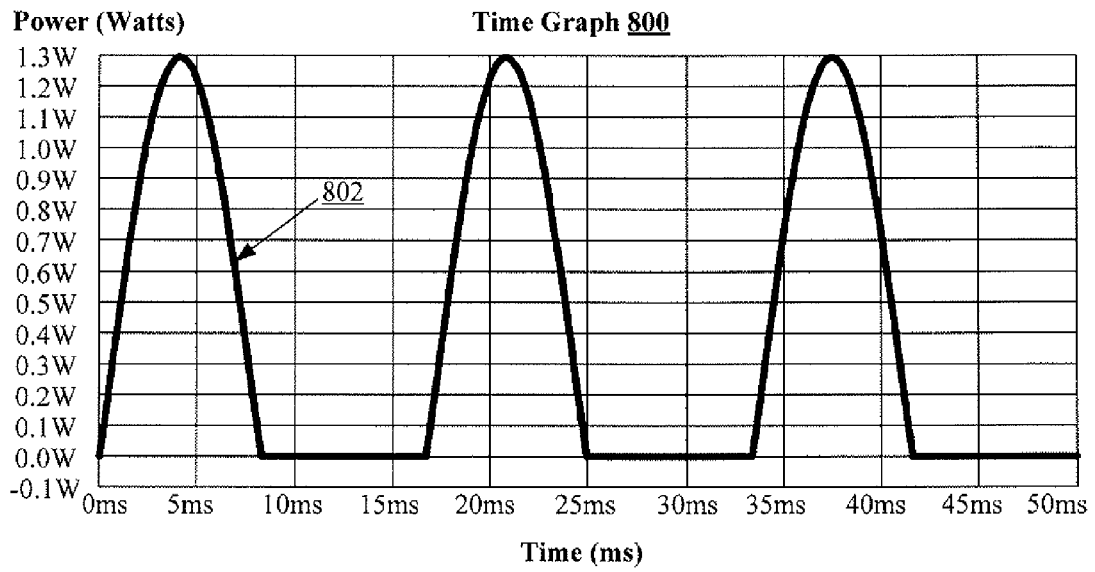
FIG. 8A is a time graph showing that a power dissipation waveform for a diode of a conventional diode bridge rectifier circuit.
Figure 8B:
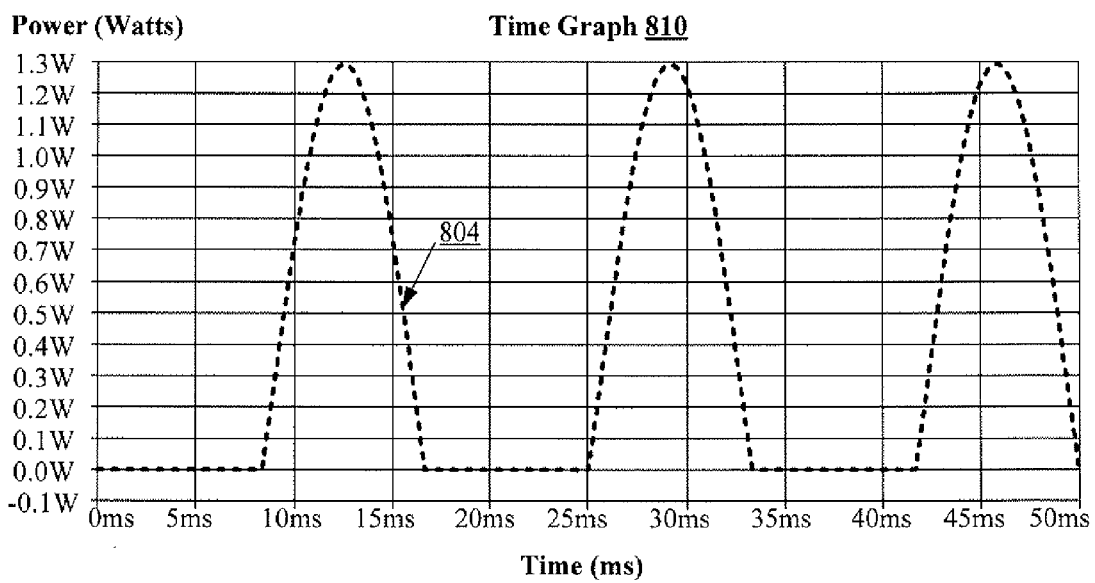
FIG. 8B is a time graph showing that a power dissipation waveform for a diode of a conventional diode bridge rectifier circuit.
Figure 8C:
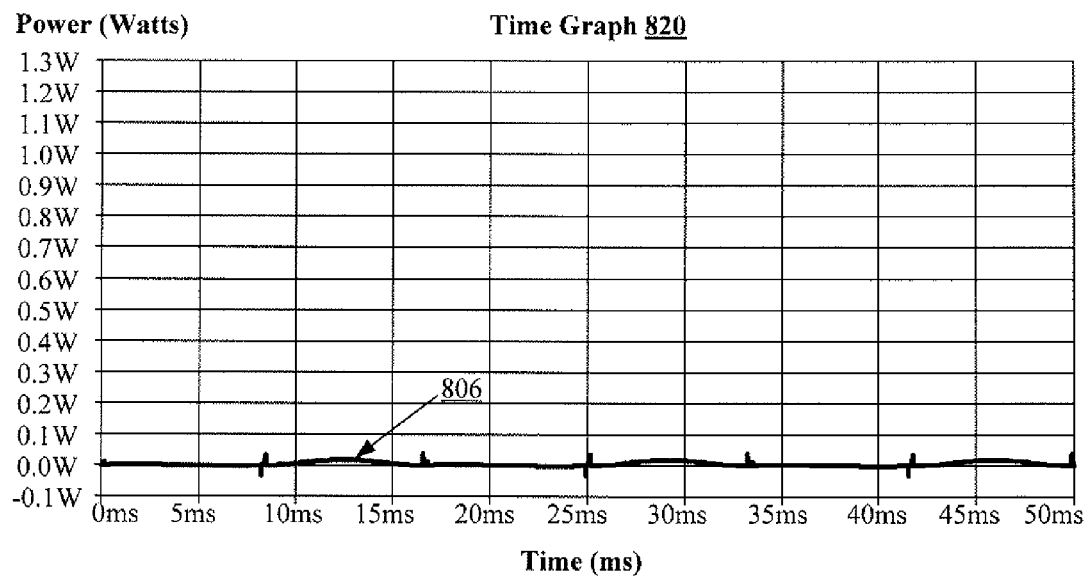
FIG. 8C is a time graph showing that a power dissipation waveform for an N-channel MOSFET of FIG. 1.
Figure 8D:
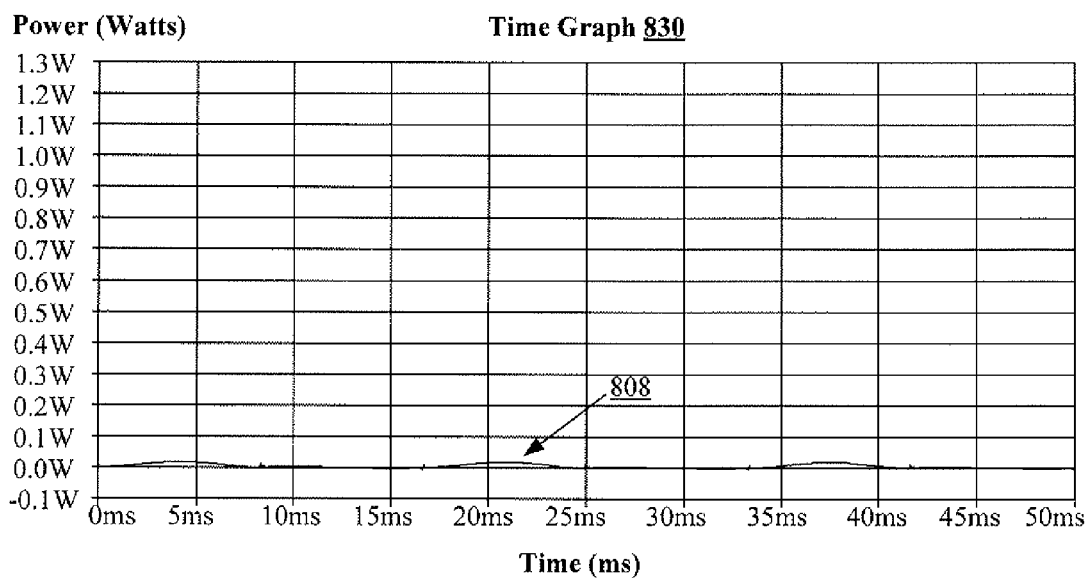
FIG. 8D is a time graph showing that a power dissipation waveform for an N-channel MOSFET of FIG. 1.
Figure 8E:
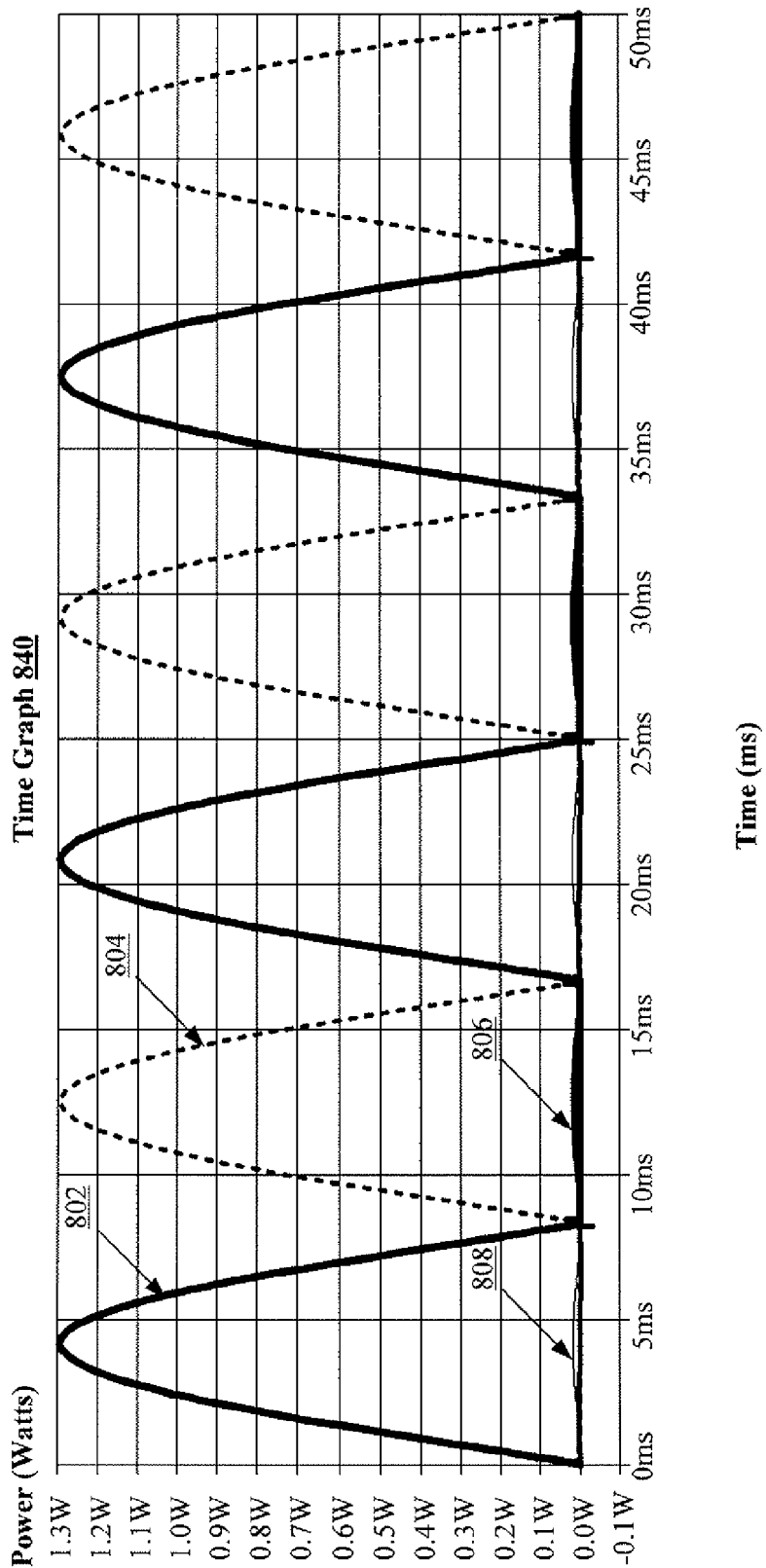
FIG. 8E is a time graph showing the power dissipation waveforms shown in FIGS. 8A-8D overlapping each other.
Figure 9:
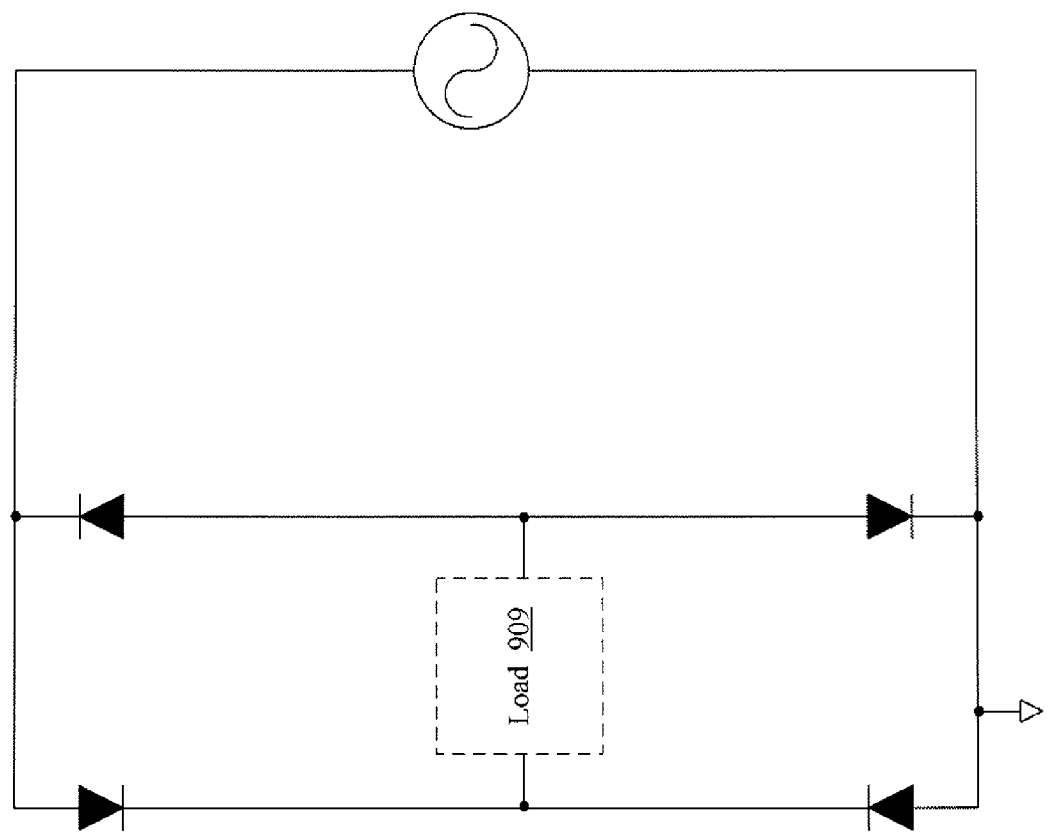
FIG. 9 is a schematic illustration of a conventional diode bridge rectifier circuit.

Referring now to FIGS. 8A-8E, there are provided power dissipation time graphs 800, 810, 820, 830, 840 that are useful for understanding certain advantages of the present invention. Each of the time graphs 800, 810, 820, 830 shows a respective power dissipation waveform 802, 804, 806, 808. It should be noted that FIG. 8E shows the power dissipation waveforms 802, 804, 806, 808 of FIGS. 8A-8D overlapping each other. As shown in FIGS. 8A-8E, each of the first and second power dissipation waveforms 802, 804 represents power dissipated in a diode of a conventional bridge rectifier circuit 900 with the load 909 connected thereto as shown in FIG. 9. Each of the third and fourth power dissipation waveforms 806, 808 represent power dissipated in an N-channel MOSFET of the transistor active bridge circuit 100 with a load (not shown in FIG. 1) connected thereto.

As evidenced by the power dissipation time graph 840 of FIG. 8E, the amount of power dissipated in the field-effect transistors of the transistor active bridge circuit 100 is substantially less than the power dissipated in the diodes of the conventional transistor active bridge 900. For example, the power dissipated in the N-channel field-effect transistors of the transistor active bridge circuit 100 can be reduced by approximately ninety-eight percent or more (>98%) as compared to the power dissipated in the diodes of the conventional transistor active bridge 900 of FIG. 9. Notably, the transistor active bridge circuit 100 can be modified so as to decrease the amount of power dissipated in the N-channel field-effect transistors than that shown in FIG. 8E. For example, the power dissipated in the transistor active bridge circuit 100 can be further reduced if one or more field-effect transistors are connected in parallel with the field-effect transistors 102, 104, 106, 108. The power dissipated in the transistor active bridge circuit 100 can also be further reduced if field-effect transistors with relatively low drain-to-source "on" state resistances $R_{DSon}$ are employed.

Three-Phase Bridge Rectifier

Figure 10:
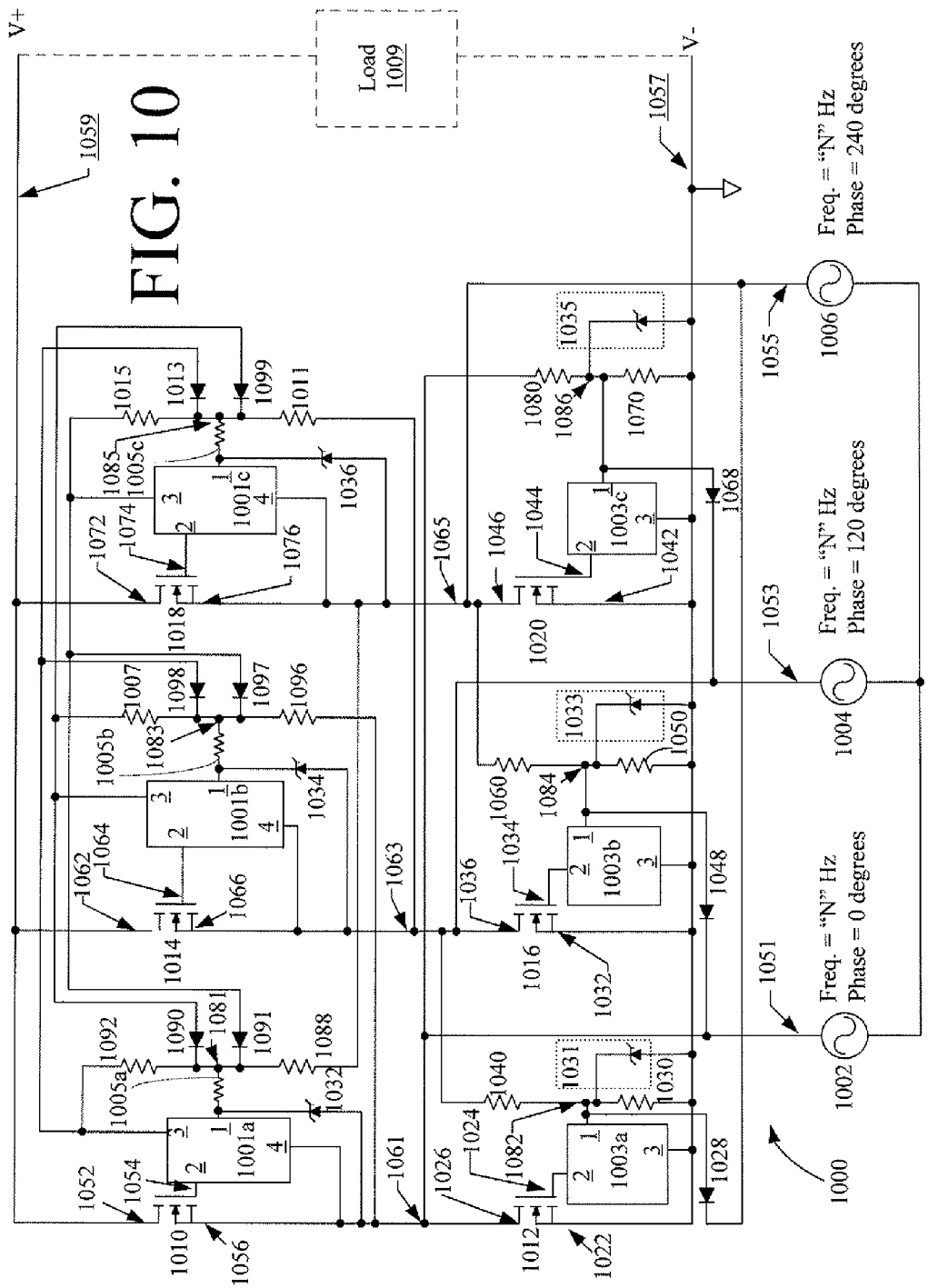
FIG. 10 is a schematic representation of an exemplary three-phase bridge rectifier circuit with active gate drive.
Figure 11:
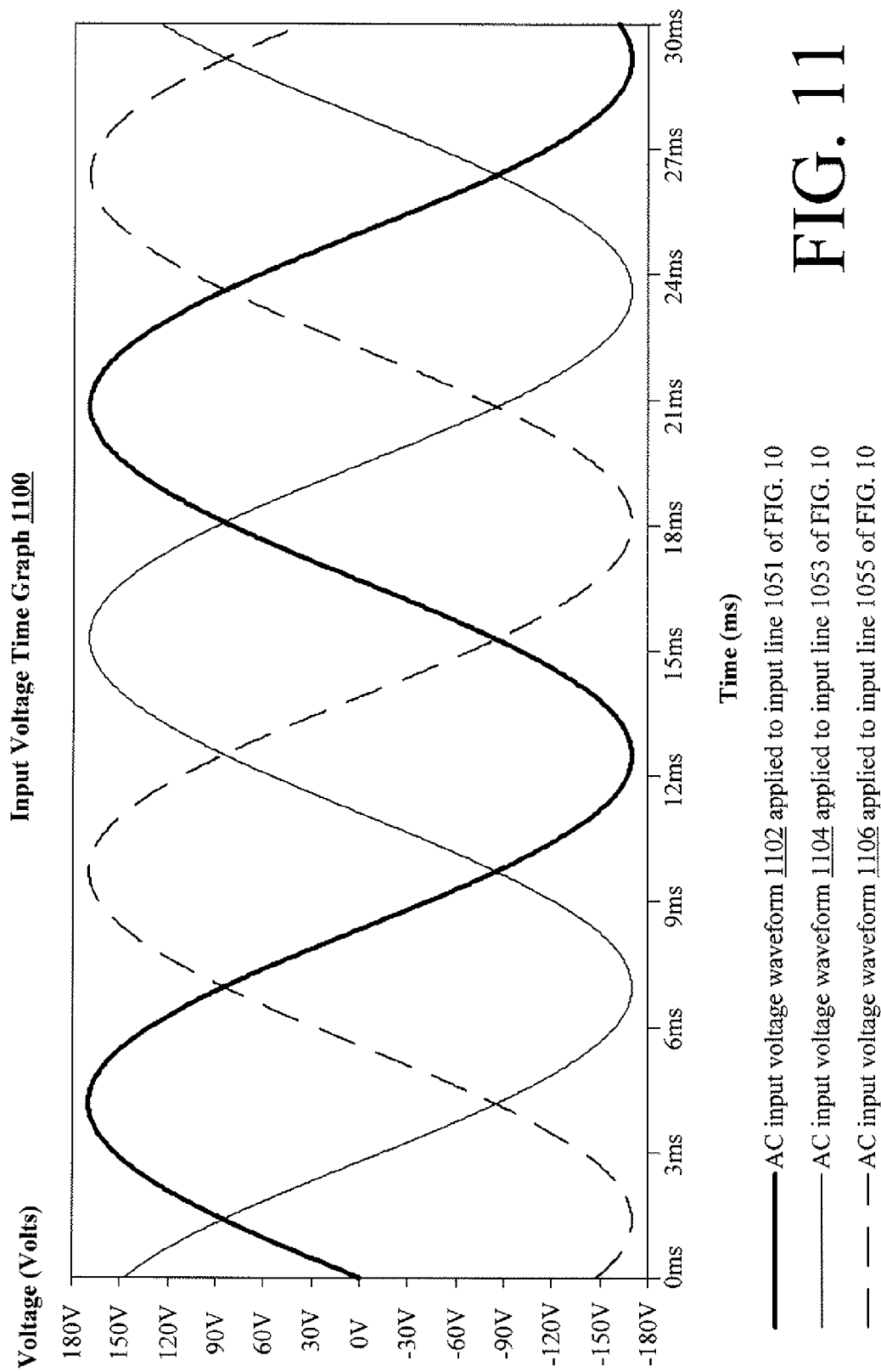
FIG. 11 is a time graph showing three (3) exemplary AC input voltage waveforms of the three-phase bridge rectifier circuit shown in FIG. 10.

A three-phase bridge rectifier circuit 1000 is shown in FIG. 10. The three-phase bridge rectifier circuit 1000 shown in FIG. 10 is useful for a variety of purposes, including rectification of domestic three-phase AC mains (for example, 208V, 60 Hz) and/or foreign three-phase AC mains (for example, 400V, 50 Hz) with low power loss. As may be observed in FIG. 10, the three-phase bridge rectifier circuit 1000 is supplied three (3) AC voltages that differ in phase by one-third (⅓) of a cycle or one hundred twenty degrees (120°). As such, the three-phase bridge rectifier circuit 1000 is connectable to at least one AC voltage source 1002, 1004, 1006 via three (3) input lines 1051, 1053, 1055. The AC voltage sources 1002, 1004 and 1006 shown in FIG. 10 can collectively comprise a single three-phase AC voltage source (e.g., a three-phase transformer). In this scenario, the three-phase bridge rectifier circuit 1000 is supplied with a first AC voltage waveform having a phase shift of zero degrees (0°), a second AC voltage waveform having a phase shift of one hundred twenty degrees (120°), and a third AC voltage waveform having a phase shift of two hundred forty degrees (240°). Each of the AC voltage waveforms has the same frequency "N" expressed in Hertz (e.g., 60 Hz). An input voltage time graph 1100 showing exemplary AC input voltage waveforms 1102, 1104, 1106 supplied to the three-phase bridge rectifier circuit 1000 by AC voltage source(s) 1002, 1004, 1006 is provided in FIG. 11. Notably, the AC input voltage waveforms 1102, 1104, 1106 are measured differentially across the AC voltage source(s) 1002, 1004, 1006 and not with respect to ground. The three-phase bridge rectifier circuit 1000 is also connected between a pair of output lines 1059, 1057. The output lines 1059, 1057 can be connected across a load 1009 so that the load 1009 can be supplied a DC output voltage of the three-phase bridge rectifier circuit 1000. An output voltage time graph 1300 showing an exemplary output voltage waveform 1302 of the three-phase bridge rectifier circuit 1000 is provided in FIG. 13.

As shown in FIG. 10, the three-phase bridge rectifier circuit 1000 includes a plurality of field effect transistors 1010, 1012, 1014, 1016, 1018, 1020 of the same channel type, e.g., an N-channel type. Each of the field effect transistors 1010, 1012, 1014, 1016, 1018, 1020 can be enhancement mode devices. For example, the N-channel type transistor can be model number IXFX90N30, which is available from IXYS Corporation of Milpitas, Calif. Still, it should be understood that other types of field effect transistors can also be selected depending upon the anticipated voltage and current handling requirements of the three-phase bridge rectifier circuit 1000.

As will be understood by those having ordinary skill in the art, each of the field effect transistors 1010, 1012, 1014, 1016, 1018, 1020 will have three (3) terminals respectively defined as a source, gate and drain. With regard to the field effect transistor 1010, the source, gate and drain terminals are respectively identified with reference numbers 1056, 1054 and 1052. The source, gate and drain terminals of field effect transistors 1014 and 1018 are respectively identified as 1066, 1064, 1062 and 1076, 1074, 1072. With regard to the field effect transistor 1012, the source, gate and drain terminals are respectively identified with reference numbers 1022, 1024, 1026. The source, gate and drain terminals of field effect transistors 1016 and 1020 are respectively identified as 1032, 1034, 1036 and 1042, 1044, 1046.

An electrical path can be provided from the source to the drain of each field effect transistor 1010, 1012, 1014, 1016, 1018, 1020. This path is generally referred to herein as the source-drain path. Although not always shown in schematic illustrations, field effect transistor devices, such as MOS-FETs, typically have an intrinsic body diode that results from the manner in which the field effect transistor devices are manufactured. This intrinsic body diode 308 is illustrated in FIG. 3 for an N-channel MOSFET 304.

Referring again to FIG. 10, it can be observed that a source-drain path of field effect transistor 1010 can be connected in series with a source-drain path of the field effect transistor 1012. The series connected transistor pair 1010, 1012 form a first series transistor combination that can be connected across the output lines 1059, 1057. A source-drain path of the field effect transistor 1014 can be connected in series with a source-drain path of the field effect transistor 1016 to form a second series transistor combination connected across the output lines 1059, 1057. A source-drain path of the field effect transistor 1018 can be connected in series with a source-drain path of the field effect transistor 1020 to form a third series transistor combination connected across the output lines 1059, 1057.

As noted above, the three-phase bridge rectifier circuit 1000 has three (3) input lines 1051, 1053, 1055 electrically coupled to at least one AC voltage source 1002, 1004, 1006. A first one of the input lines 1051 is connected to the first series combination 1010, 1012 at an interconnection point 1061 between the field effect transistors 1010, 1012. A second one of the input lines 1053 can be connected to the second series combination 1014, 1016 at an interconnection point 1063 between the field effect transistors 1014, 1016. A third one of the input lines 1055 can be connected to the third series combination 1018, 1020 at an interconnection point 1065 between the field effect transistors 1018, 1020.

A gate driver circuit 1001a, 1003a, 1001b, 1003b, 1001c, 1003c is provided for each field effect transistor 1010, 1012, 1014, 1016, 1018, 1020. A terminal 3 of each gate driver circuit 1003a, 1003b, 1003c is connected to the output line 1057. A terminal 3 of each gate driver circuit 1001a, 1001b, 1001c is coupled to voltage divider circuits (described below) for the field effect transistors 1010, 1014, 1018. For example, the terminal 3 of the gate driver circuit 1001a is connected to voltage divider circuit 1092/1088 provided therefore. The terminal 3 of the gate driver circuit 1001a is also coupled to a voltage tap 1083 via a diode 1098 and a voltage tap 1085 via a diode 1013. Similarly, the terminal 3 of the gate driver circuit 1001b is connected to voltage divider circuit 1007/1096 provided therefore. The terminal 3 of the gate driver circuit 1001b is also coupled to a voltage tap 1081 via a diode 1090 and a voltage tap 1085 via a diode 1099. Likewise, the terminal 3 of the gate driver circuit 1001c is connected to voltage divider circuit 1015/1011 provided therefore. The terminal 3 of the gate driver circuit 1001c is also coupled to a voltage tap 1083 via a diode 1097 and a voltage tap 1081 via a diode 1091. A terminal 1 of each gate driver circuit 1001a, 1001b, 1001c is connected to a voltage tap 1081, 1083, 1085 of a respective field effect transistor 1010, 1014, 1018 via a resistor 1005a, 1005b, 1005c. A terminal 1 of each gate driver circuit 1003a, 1003b, 1003c is connected to a voltage tap 1082, 1084, 1086 of a respective field effect transistor 1012, 1016, 1020. A terminal 2 of each gate driver circuit 1001a, 1003a, 1001b, 1003b, 1001c, 1003c is connected to a gate 1054, 1024, 1064, 1034, 1074, 1044 of a respective field effect transistor 1010, 1012, 1014, 1016, 1018, 1020. A terminal 4 of each gate driver circuit 1001a, 1001b, 1001c is connected to a respective interconnection point 1061, 1063, 1065 between the field effect transistors.

Each gate driver circuit 1001a, 1003a, 1001b, 1003b, 1001c, 1003c is generally configured to supply a voltage to the gate 1054, 1024, 1064, 1034, 1074, 1044 of a respective field effect transistor 1010, 1012, 1014, 1016, 1018, 1020 at certain times for switching the field effect transistor to its "on" state or "off" state. The voltage applied to the gate 1054, 1024, 1064, 1034, 1074, 1044 of a respective field effect transistor 1010, 1012, 1014, 1016, 1018, 1020 has an "on state" or "off state" voltage value (e.g., 0 volts, 8.2 volts or 12 volts) selected in accordance with a particular field effect transistor 1010, 1012, 1014, 1016, 1018, 1020 application. Each gate driver circuit 1001a, 1003a, 1001b, 1003b, 1001c, 1003c is also generally configured to stop supplying the voltage to the gate 1054, 1024, 1064, 1034, 1074, 1044 of a respective field effect transistor 1010, 1012, 1014, 1016, 1018, 1020 at certain times for switching the field effect transistor to its "on" state or its "off" state.

An exemplary embodiment of the gate driver circuits 1001a, 1001b, 1001c is described above in relation to FIGS. 2A and 2C. Similarly, an exemplary embodiment of the gate driver circuits 1003a, 1003b, 1003c is described above in relation to FIGS. 2B and 2D. The FET "on/off" state switching scheme and transition process will be described in detail below in relation to FIGS. 12A-12G, FIGS. 14A-14E and FIGS. 15A-15D.

The circuit 1000 further includes a plurality of devices for ensuring that each of the field effect transistors 1010, 1012, 1014, 1016, 1018, 1020 is switched to its "on" and "off" states at desirable times. These devices can include, but are not limited to, voltage divider circuits 1092/1088, 1030/1040, 1007/1096, 1050/1060, 1015/1011, 1070/1080 and diodes 1090, 1091, 1028, 1097, 1098, 1048, 1013, 1099, 1068.

As shown in FIG. 10, a voltage divider circuit is provided for each of the gate driver circuits 1001a, 1003a, 1001b, 1003b, 1001c, 1003c. Each of the voltage divider circuits can be comprised of a first resistor and a second resistor connected in series. However, those having ordinary skill in the art will appreciate that numerous different types of voltage dividers circuits are possible and can be used for the purposes as hereinafter described. The voltage divider circuit for the gate driver circuit 1001a can include first resistor 1092 and second resistor 1088. The voltage divider circuit for gate driver circuit 1003a can include first resistor 1030 and a second resistor 1040. The voltage divider circuit for the gate driver circuit 1001b can include a first resistor 1007 and a second resistor 1096. The voltage divider circuit for the gate driver circuit 1003b can include a first resistor 1050 and a second resistor 1060. The voltage divider circuit for the gate driver circuit 1001c can include a first resistor 1015 and a second resistor 1011. The voltage divider circuit for the gate driver circuit 1003c can include a first resistor 1070 and a second resistor 1080.

In FIG. 10, the first and second resistors 1092/1088, 1007/1096, 1015/1011 are connected in series from a terminal 3 of a respective gate driver circuit 1001a, 1001b, 1001c to one of the interconnection points 1061, 1063, 1065. For example, the resistor combination 1092, 1088 is connected from terminal 3 of the gate driver circuit 1001a to the interconnection point 1065. The resistor combination 1007, 1096 is connected from terminal 3 of the gate driver circuit 1001b to the interconnection point 1061. The resistor combination 1015, 1011 is connected from terminal 3 of the gate driver circuit 1001c to the interconnection point 1063.

The first and second resistors 1030/1040, 1050/1060, 1070/1080 are connected from terminal a respective input line 1051, 1053, 1055 to the output line 1057. For example, the resistor combination 1030, 1040 is connected from input line 1053 to output line 1057. The resistor combination 1050, 1060 is connected from input line 1055 to output line 1057. The resistor combination 1070, 1080 is connected from input line 1051 to output line 1057.

Each voltage divider advantageously provides a voltage tap 1081, 1082, 1083, 1084, 1085, 1086. For example, if a resistive voltage divider is used as shown in FIG. 10, then the voltage tap 1081, 1082, 1083, 1084, 1085, 1086 can be provided at a connection point between the first and second resistors. The voltage tap 1081, 1083, 1085 of each voltage divider is connected to a terminal 1 of a respective gate drive circuit 1001a, 1001b, 1001c via a resistor 1005a, 1005b, 1005c. The voltage tap 1082, 1084, 1086 of each voltage divider is connected to a terminal 1 of a respective gate drive circuit 1003a, 1003b, 1003c. Consequently, the voltage tap 1081, 1082, 1083, 1084, 1085, 1086 advantageously provides a substantially reduced voltage output relative to the input voltage applied to the circuit 1000 by AC voltage source(s) 1002, 1004, 1006. For example, each of the voltage taps 1081, 1082, 1083, 1084, 1085, 1086 of a respective voltage divider can provide an output that is reduced by 10% to 90% relative to the input voltage.

Notably, the circuit 1000 is not limited to any particular range of voltage reduction by the voltage divider. The purpose of the voltage divider is to permit a relatively larger range of input voltages to be applied to the circuit 1000 via input lines 1051, 1053, 1055 without producing excessively high voltage levels at a terminal 1 of a gate drive circuit 1001a, 1003a, 1001b, 1003b, 1001c, 1003c. However, the voltage divider should still produce a voltage at a terminal 1 of a gate drive circuit 1001a, 1003a, 1001b, 1003b, 1001c, 1003c that is of sufficient magnitude to indicate when a respective field effect transistor is to be switched to its "on" state. For example, the first resistor 1092, 1030, 1007, 1050, 1015, 1070 can be selected to be about five hundred kilo Ohms (500 kΩ) and the second resistor 1088, 1040, 1096, 1060, 1011, 1080 can be selected to be about fifty kilo Ohms (50 kΩ). In this scenario, the circuit 100 can include optional voltage clamping circuits 1032, 1031, 1034, 1033, 1036, 1035 (described below). Still, those having ordinary skill in the art will appreciate that a variety of other voltage divider values can and should be used depending upon the design criteria for input voltage range and transistor specifications.

Further, at least one of the optional voltage clamping circuits 1032, 1031, 1034, 1033, 1036, 1035 can be provided to ensure that the voltage applied to the input terminals 1 of the respective gate drive circuits 1003a, 1003b, 1003c does not become excessively large as the three-phase AC input voltage is increased. Any suitable voltage clamping circuit can be used for this purpose. For example, each of the voltage clamping circuits 1031, 1033, 1035 could be simply implemented as a zener diode 1031, 1033, 1035 that is connected in parallel with a first resistor 1030, 1050, 1070 between a terminal 1 of a respective gate drive circuit 1003a, 1003b, 1003c and the source terminals 1022, 1032, 1042 of the field effect transistors 1012, 1016, 1020. Embodiments of the present invention are not limited in this regard.

The zener diodes 1032, 1031, 1034, 1033, 1036, 1035 can ensure that the voltage between the input terminals 1 of the gate drive circuits 1001a, 1003a, 10001b, 1003b, 1001c, 1003c and the source terminals 1056, 1022, 1066, 1032, 1076, 1042 of the field effect transistors 1010, 1012, 1014, 1016, 1018, 1020 is limited. For example, each of the zener diodes 1032, 1031, 1034, 1033, 1036, 1035 can prevent the voltage between a terminal 1 of a respective gate drive circuit 1001a, 1003a, 10001b, 1003b, 1001c, 1003c and a source 1056, 1022, 1066, 1032, 1076, 1042 of a respective field effect transistor 1010, 1012, 1014, 1016, 1018, 1020 from exceeding a predetermined threshold voltage defined by the reverse breakdown voltage of the zener diode 1032, 1031, 1034, 1033, 1036, 1035.

A further advantage of using a voltage clamp as described herein is it allows adequate voltage levels to be developed between the input terminals 1 of the gate drive circuits 1001a, 1003a, 10001b, 1003b, 1001c, 1003c and the source terminals 1056, 1022, 1066, 1032, 1076, 1042 of the field effect transistors 1010, 1012, 1014, 1016, 1018, 1020, even with relatively low input voltages applied to the circuit 1000 via input lines 1051, 1053, 1055. For example, the voltage divider can be designed to allow a relatively large proportion of the input voltage (e.g., 70%) to appear at a voltage tap 1081, 1082, 1083, 1084, 1085, 1086. The larger proportion of voltage ensures that the gate driver circuits 1001a, 1003a, 1001b, 1003b, 1001c, 1003c will switch the field effect transistors 1010, 1012, 1014, 1016, 1018, 1020 to their "on" state or "off" state at the appropriate times, even with relatively low input voltages from the AC voltage source(s) 1002, 1004, 1006. In order to ensure that this larger proportion of voltage does not damage the gate driver circuits 1001a, 1003a, 1001b, 1003b, 1001c, 1003c when considerably higher input voltages are applied to the circuit 1000, the clamping circuit (zener diode 1032, 1031, 1034, 1033, 1036, 1035 in FIG. 10) can clamp the output of the voltage divider at a predetermined level.

The diodes 1090, 1091, 1028, 1098, 1097, 1048, 1013, 1099, 1068 are provided to ensure that each of the field effect transistors 1010, 1012, 1014, 1016, 1018, 1020 is switched to its "on" state at desirable times. Accordingly, diodes 1090, 1099 are connected between a terminal 3 of the gate drive circuit 1001b and a terminal 1 of a respective one of the gate drive circuits 1001a, 1001c through resistors 1005a, 1005c. The diodes 1091, 1097 are connected between a terminal 3 of the gate drive circuit 1001c and a terminal 1 of a respective one of the gate drive circuits 1001a, 1001b through resistors 1005a, 1005b. The diodes 1098, 1013 are connected between a terminal 3 of the gate drive circuit 1001a and a terminal 1 of a respective one of the gate drive circuits 1001b, 1001c through resistors 1005b, 1005c. Notably, the terminal 3 of each gate drive circuit 1001a, 1001b, 1001c is connected to a voltage source 202 as shown in FIG. 2A. A diode 1028 is connected between the AC voltage source 1006 and the terminal 1 of the gate drive circuit 1003a for the second field effect transistor 1012. A diode 1048 is connected between the AC voltage source 1002 and the terminal 1 of the gate drive circuit 1003b for the field effect transistor 1016. A diode 1068 is connected between the AC voltage source 1004 and the terminal 1 of the gate drive circuit 1003c for the field effect transistor 1020. The importance of the diodes 1090, 1091, 1028, 1098, 1097, 1048, 1013, 1099, 1068 will become clear in the discussion below regarding the detailed operation of the circuit 1000.

Figure 12A:
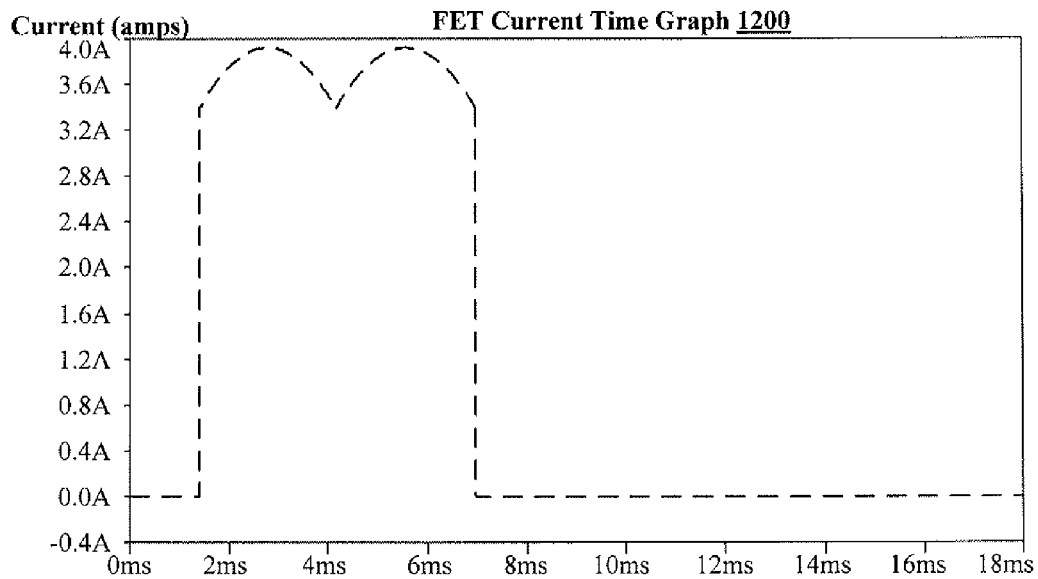
FIG. 12A is a time graph showing an exemplary source current waveform for a first field effect transistor shown in FIG. 10.
Figure 12B:
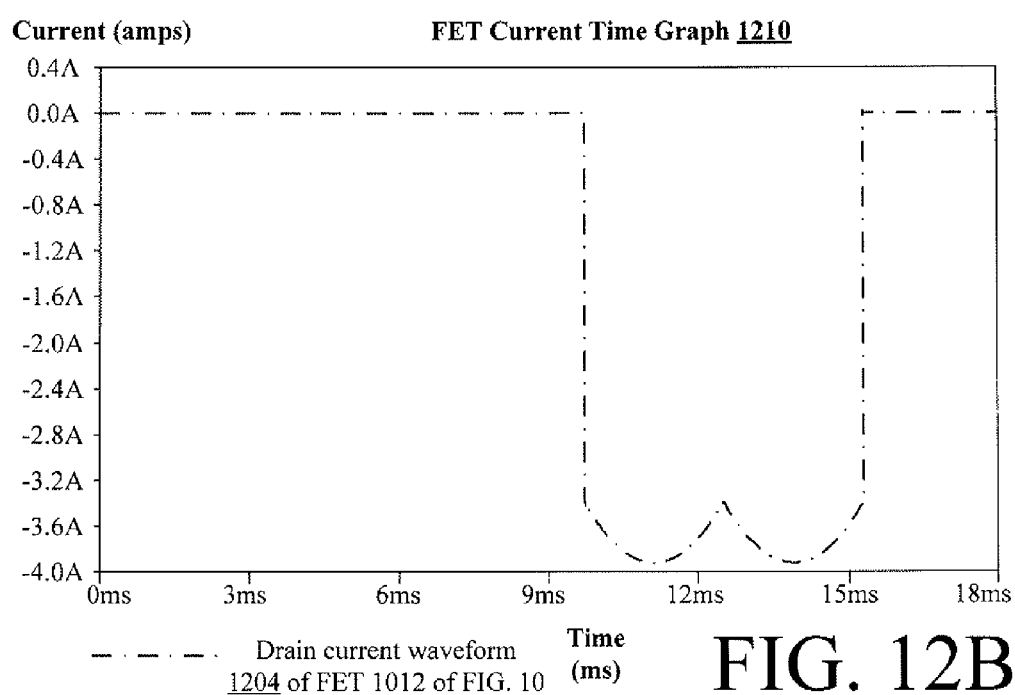
FIG. 12B is a time graph showing an exemplary drain current waveform for a second field effect transistor shown in FIG. 10.
Figure 12C:
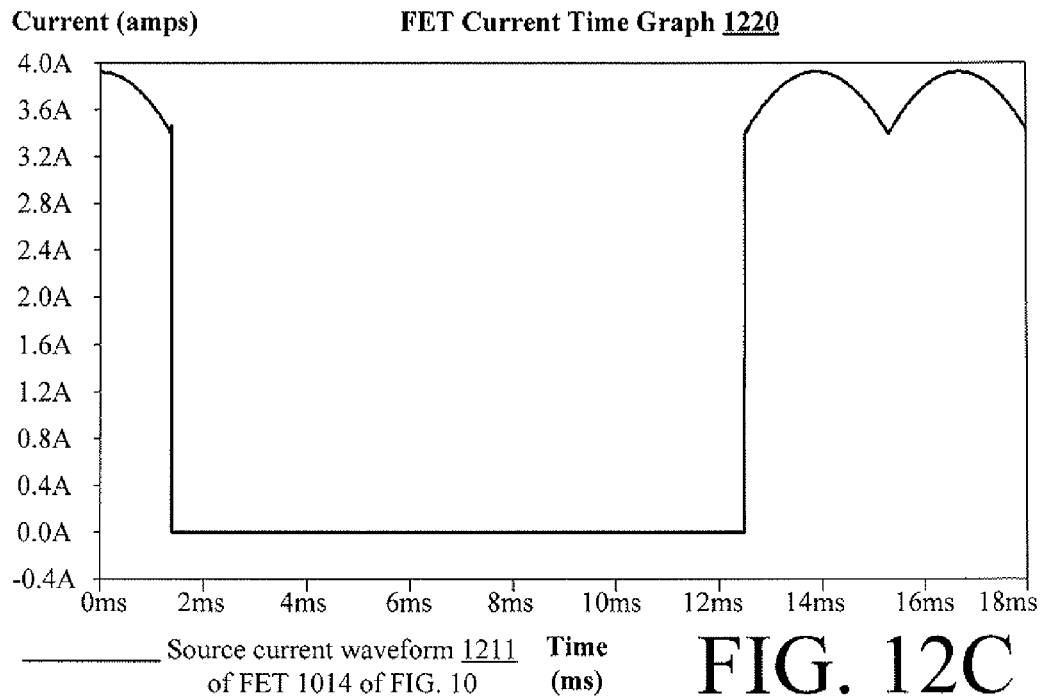
FIG. 12C is a time graph showing an exemplary source current waveform for a third field effect transistor shown in FIG. 10.
Figure 12D:
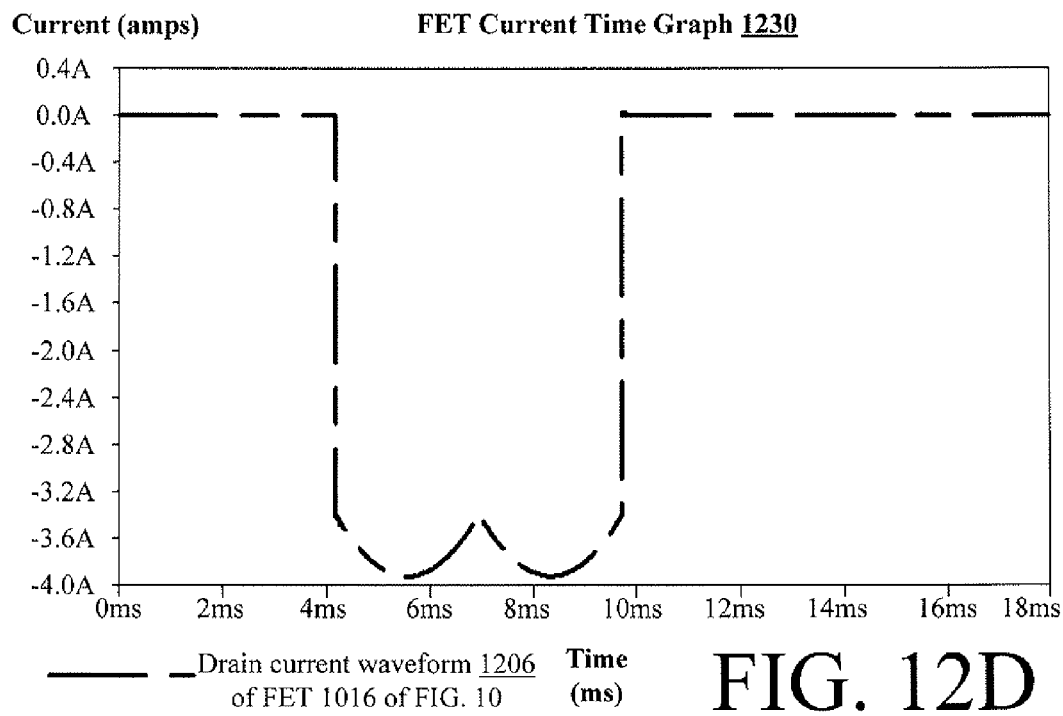
FIG. 12D is a time graph showing an exemplary drain current waveform for a fourth field effect transistor shown in FIG. 10.
Figure 12E:
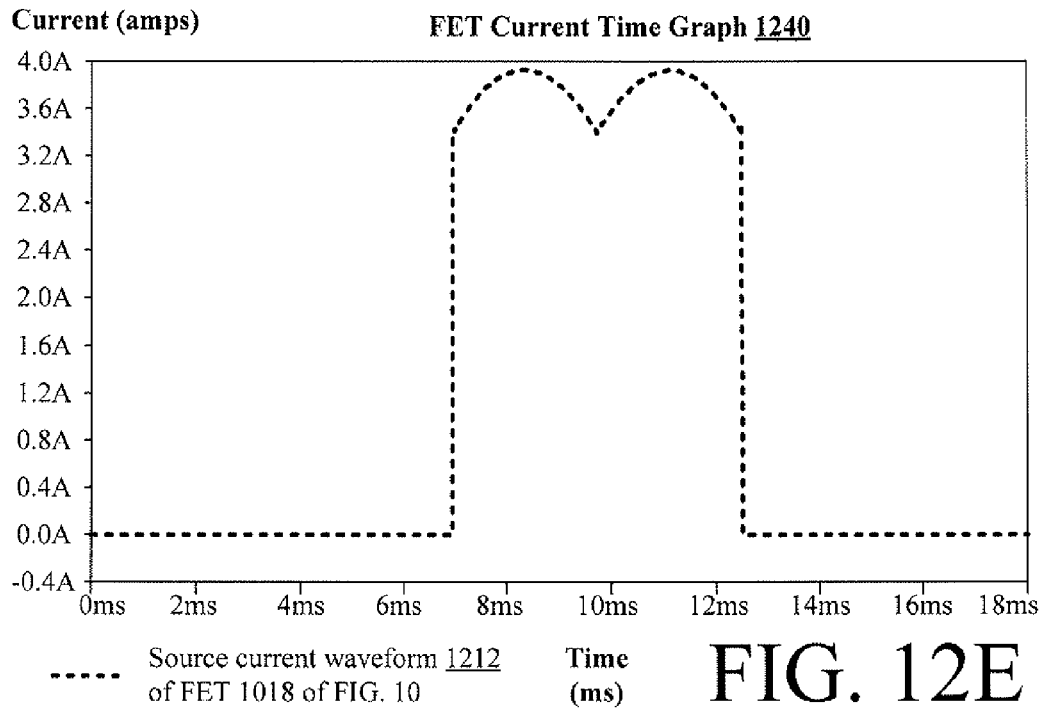
FIG. 12E is a time graph showing an exemplary source current waveform for a fifth field effect transistor shown in FIG. 10.
Figure 12F:
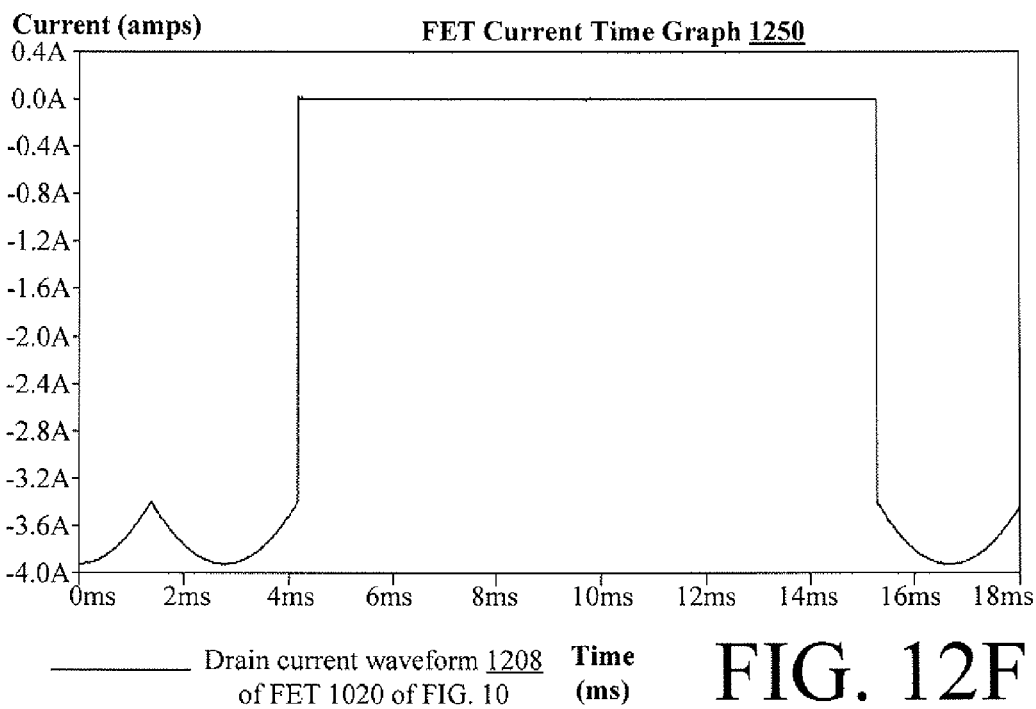
FIG. 12F is a time graph showing an exemplary drain current waveform for a sixth field effect transistor shown in FIG. 10.
Figure 13:
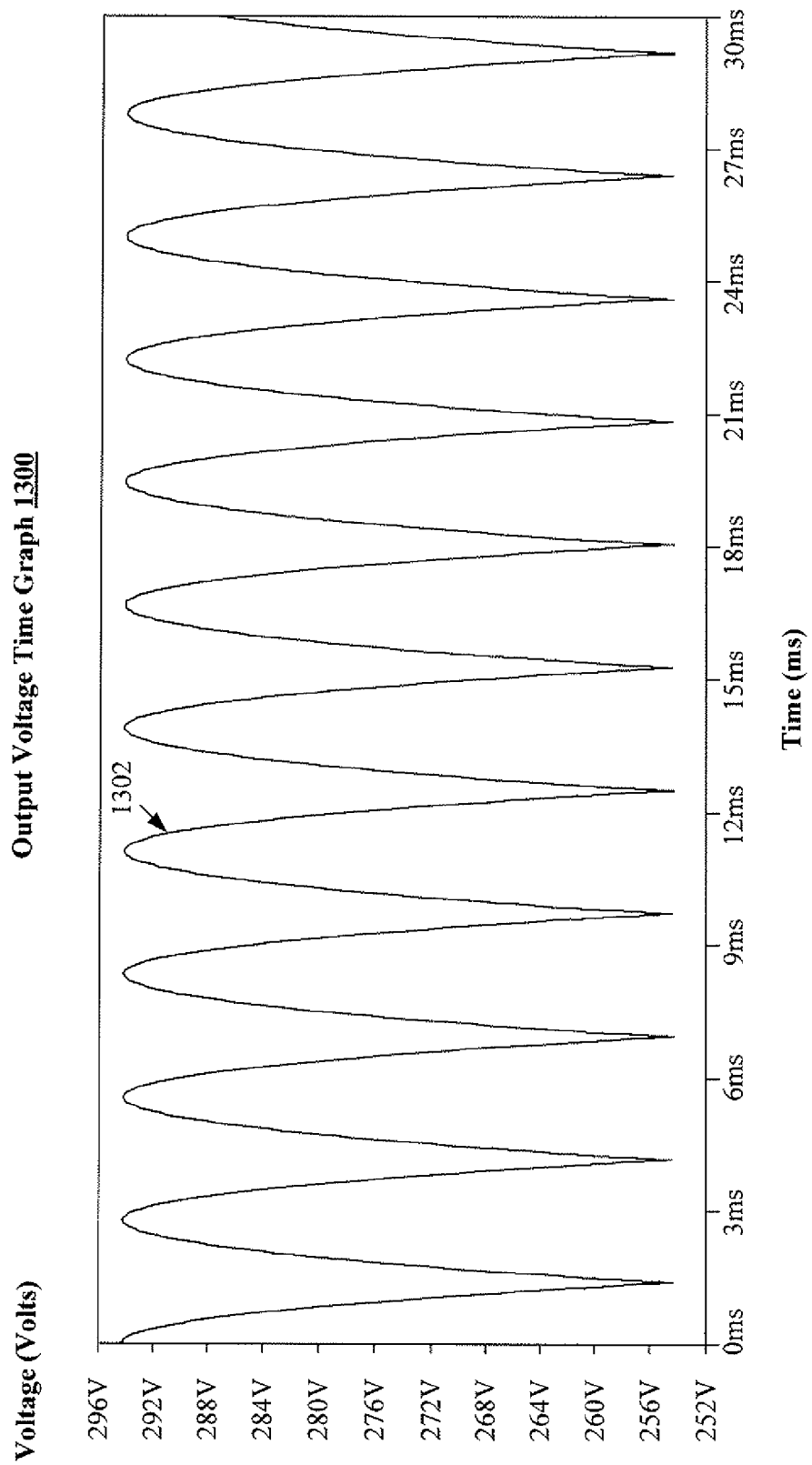
FIG. 13 is a time graph showing an exemplary DC output voltage waveform of the three-phase bridge rectifier circuit shown in FIG. 10.

The operation of the three-phase bridge rectifier circuit 1000 will now be described in detail in relation to FIGS. 10-15D and 18. When AC voltage waveforms (e.g., AC voltage waveforms 1102, 1104 and 1106 of FIGS. 11 and 14E) are applied to circuit 1000 via input lines 1051, 1053 and 1055, only one field effect transistor 1010, 1014, 1018 will be switched to its "on" state at any given time. This MOSFET on/off switching scheme is illustrated by the FET source current time graphs 1200 1220, 1240 of FIGS. 12A, 12C, 12E, the FET drain current time graphs 1210, 1230, 1250 of FIGS. 12B, 12D, 12F, and the FET drain and source time graph 1260 of FIG. 12G. Each of the FET current time graphs 1200, 1210, 1220, 1230, 1240, 1250 shows a respective current waveform 1202, 1204, 1211, 1206, 1212, 1208. It should be noted that FIG. 12G shows the current waveforms 1202, 1204, 1211, 1206, 1212, 1208 of FIGS. 12A-12F overlapping each other. The MOSFET on/off switching scheme for the field effect transistors 1010, 1014, 1018 is also shown in the time graph 1800 of FIG. 18.

As shown in FIGS. 12G and 18, the field effect transistor 1010 is switched to its "on" state at a time $t_a$ and switched to its "off" state at a time $t_c$ as illustrated by the waveforms 1202, 1802. At the time $t_c$, the field effect transistor 1018 is switched to its "on" state as illustrated by the source current waveform 1212 and the gate-to-source voltage waveform 1804. The field effect transistor 1018 is switched to its "off" state at a time $t_e$ as also illustrated by the waveforms 1212, 1804. At the time $t_e$, the field effect transistor 1014 is switched to its "on" state as illustrated by the source current waveform 1211 and the gate-to-source voltage waveform 1806. The field effect transistor 1014 is turned "off" at a time $t_g$ as also illustrated by the waveforms 1211, 1806. This "on/off" state switching process of the field effect transistors 1010, 1014, 1018 is repeated until the AC voltage source(s) 1002, 1004, 1006 cease(s) supplying AC voltage waveforms (e.g., AC voltage waveforms 1102, 1104 and 1106 of FIG. 11) to the circuit 1000.

Similarly, only one field effect transistor 1012, 1016, 1020 will be switched to its "on" state at any given time. This field effect transistor on/off switching scheme is also illustrated by the FET drain and source current graph 1260 of FIG. 12G. As shown in FIG. 12G, the field effect transistor 1020 is switched to its "on" state at a particular time (not shown) and switched to its "off" state a time $t_b$ as illustrated by the drain current waveform 1208. At time $t_b$, the field effect transistor 1016 is switched to its "on" state as illustrated by the drain current waveform 1206. The field effect transistor 1016 is switched to its "off" state at time $t_d$ as also illustrated by the drain current waveform 1206. At time $t_d$, the field effect transistor 1012 is switched to its "on" state as illustrated by the drain current waveform 1204. The field effect transistor 1012 is switched to its "off" state at time $t_f$ as also illustrated by the drain current waveform 1204. This "on/off" state switching process of the field effect transistors 1012, 1016, 1020 is repeated until the AC voltage source(s) 1002, 1004, 1006 cease(s) supplying AC voltage waveforms (e.g., AC voltage waveforms 1102, 1104 and 1106 of FIG. 11) to the circuit 1000.

As further shown by the FET drain current time graph 1260 of FIG. 12G, the field effect transistors 1010, 1014, 1018 of each series connected transistor pair 1010/1012, 1014/1016, 1018/1020 are switched to their "off" states before the field effect transistors 1012, 1016, 1020 are switched to their "on" states, respectively. For example, the field effect transistor 1010 is switched to its "off" state and remains in its "off" state before the field effect transistor 1012 is switched to its "on" state, and vise versa. Similarly, the field effect transistor 1014 is switched to its "off" state and remains in its "off" state before the field effect transistor 1016 is switched to its "on" state, and vise versa. Likewise, the field effect transistor 1018 is switched to its "off" state and remains in its "off" state before the field effect transistor 1020 is switched to its "on" state, and vise versa. In effect, cross conduction of the series connected transistor pairs 1010/1012, 1014/1016, 1018/1020 does not occur during the "on/off" state transitions thereof.

Figure 14A:
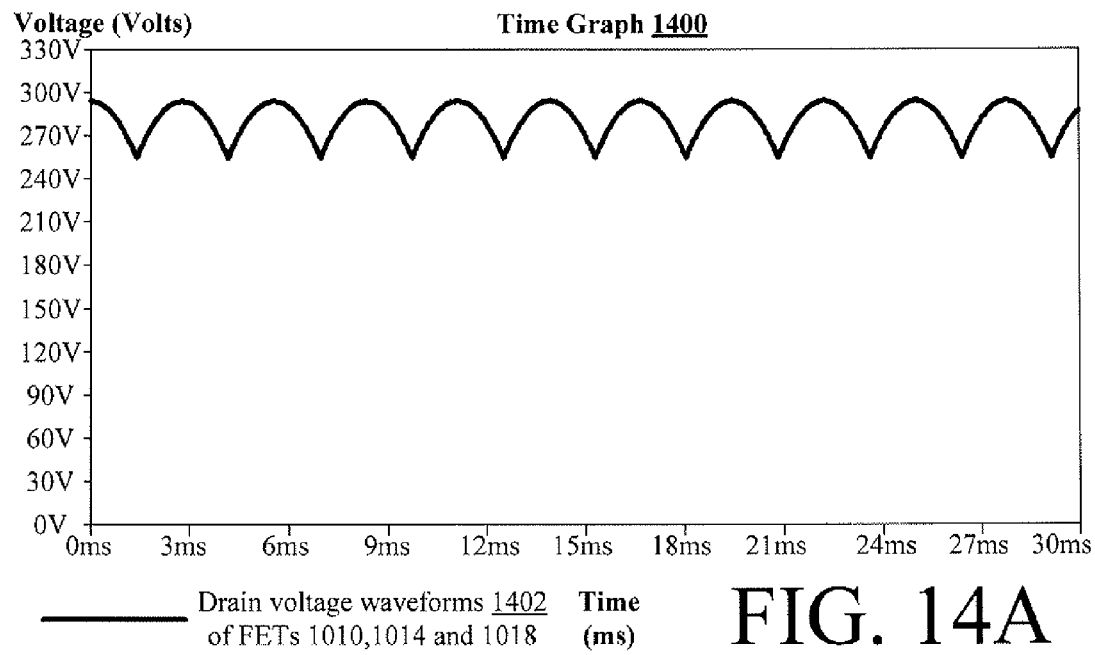
FIG. 14A is a time graph showing a drain voltage waveform of field effect transistors shown in FIG. 10.
Figure 14B:
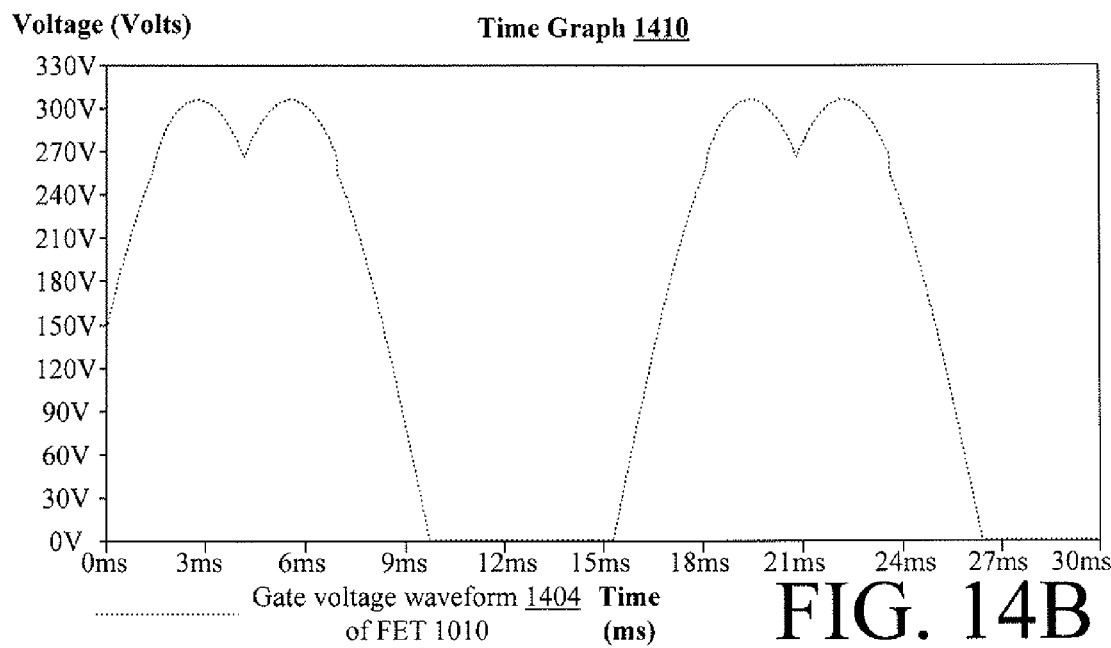
FIG. 14B is a time graph showing a gate voltage waveform of a field effect transistor shown in FIG. 10.
Figure 14C:
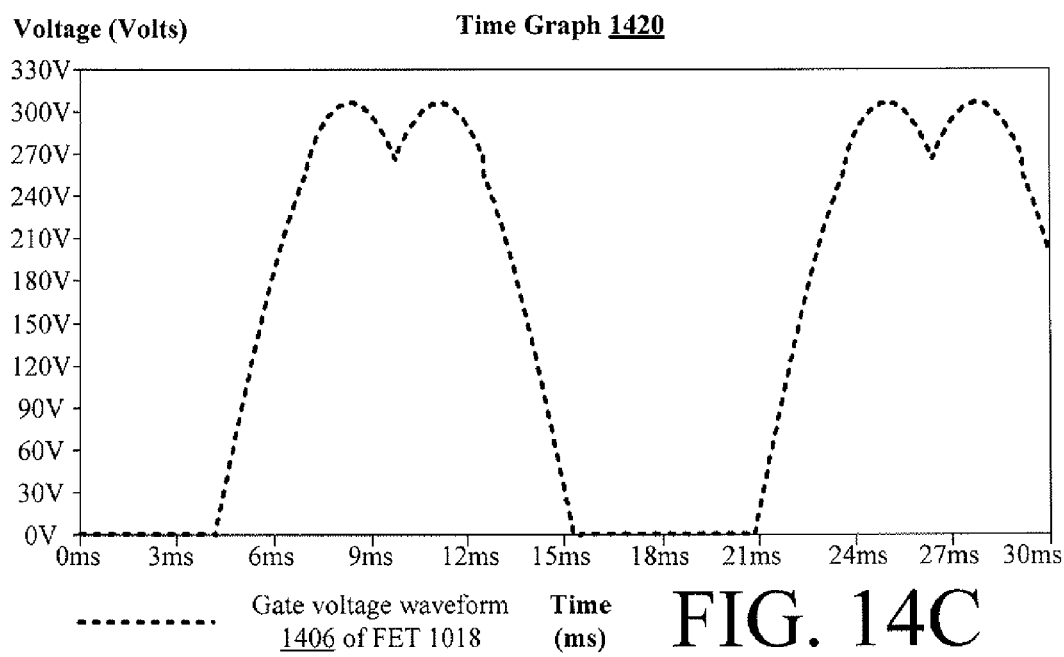
FIG. 14C is a time graph showing a gate voltage waveform of a field effect transistor shown in FIG. 10.
Figure 14D:
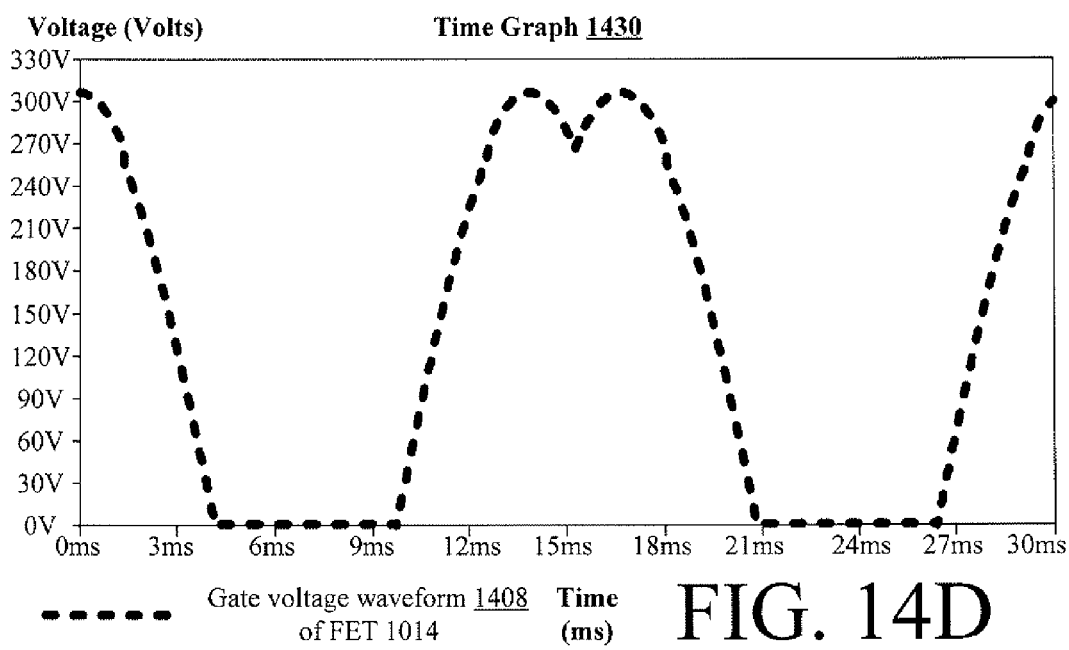
FIG. 14D is a time graph showing a gate voltage waveform of a field effect transistor shown in FIG. 10.
Figure 14E:
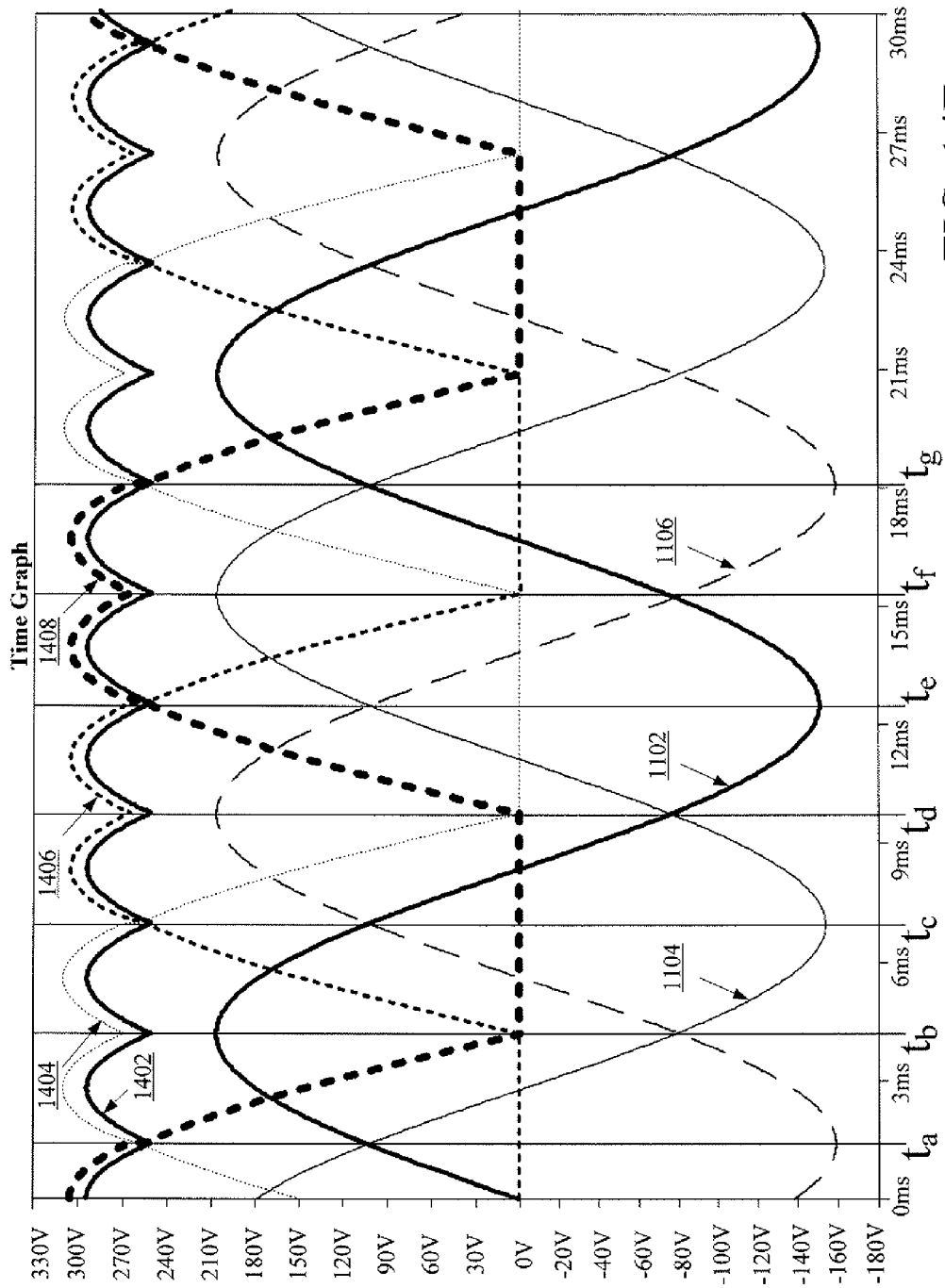
FIG. 14E is a time graph showing that a FET "on/off" state transition process is at least partially defined by the polarity of the AC voltage waveforms shown in FIG. 11 and the intersections thereof.

Notably, the FET "on/off" state transition process described above is at least partially defined by the polarity of the AC voltage waveforms (e.g., AC voltage waveforms 1102, 1104 and 1106 of FIGS. 11 and 14E) and the intersection of the AC voltage waveforms as shown by the time graph 14E. It should be noted that FIG. 14E shows the voltage waveforms 1402, 1404, 1406, 1408 of FIGS. 14A-14D overlapping each other. As shown in FIGS. 14A and 14E, voltage waveform 1402 represents a source voltage waveform for field effect transistors 1010, 1014, 1018. Voltage waveform 1404 shown in FIGS. 14B and 14E represents a gate voltage waveform of field effect transistor 1010. Voltage waveform 1406 shown in FIGS. 14C and 14E represents a gate voltage waveform of field effect transistor 1018. Voltage waveform 1408 shown in FIGS. 14D and 14E represents a gate voltage waveform of field effect transistor 1014. FIG. 14E also shows the AC voltage waveforms 1102, 1104 and 1106 of FIG. 11 overlapping each other.

As shown in FIG. 14E, if the AC input voltage waveform 1102 has a positive polarity, then the field effect transistor 1010 is switched to its "on" state at time $t_a$. Time $t_a$ represents when a rising edge of a positive polarity portion of the AC input voltage waveform 1102 and a falling edge of a positive polarity portion of the AC input voltage waveform 1104 intersect. Similarly, if the AC input voltage waveform 1106 has a positive polarity, then the field effect transistor 1018 is switched to its "on" state at time $t_c$. Time $t_c$ represents when a rising edge of a positive polarity portion of the AC input voltage waveform 1106 and a falling edge of a positive polarity portion of the AC input voltage waveform 1102 intersect. Likewise, if the AC input voltage waveform 1104 has a positive polarity, then the field effect transistor 1014 is switched to its "on" state at time $t_e$. Time $t_e$ represents when a rising edge of a positive polarity portion of the AC input voltage waveform 1104 and a falling edge of a positive polarity portion of the AC input voltage waveform 1106 intersect. As should be understood, each field effect transistor 1010, 1014, 1018 is switched to its "on" state when a gate-to-source voltage $V_{gs}$ is greater than a threshold gate-to-source voltage $V_{gs\_th}$.

Figure 15A:
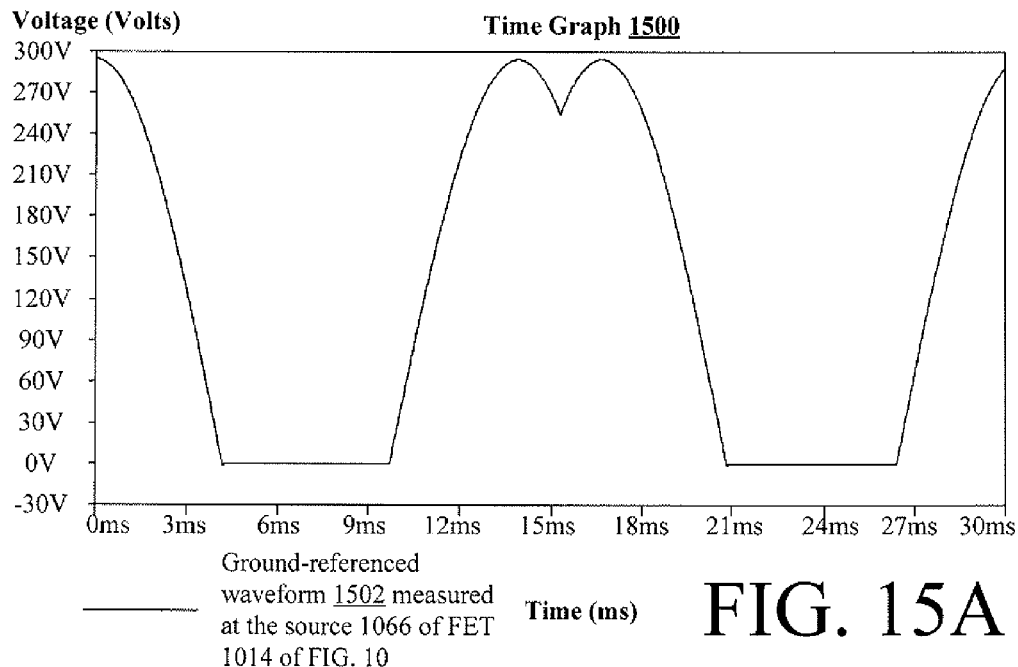
FIG. 15A is a time graph showing a first ground-referenced waveform measured at a source of a field effect transistor shown in FIG. 10.
Figure 15B:
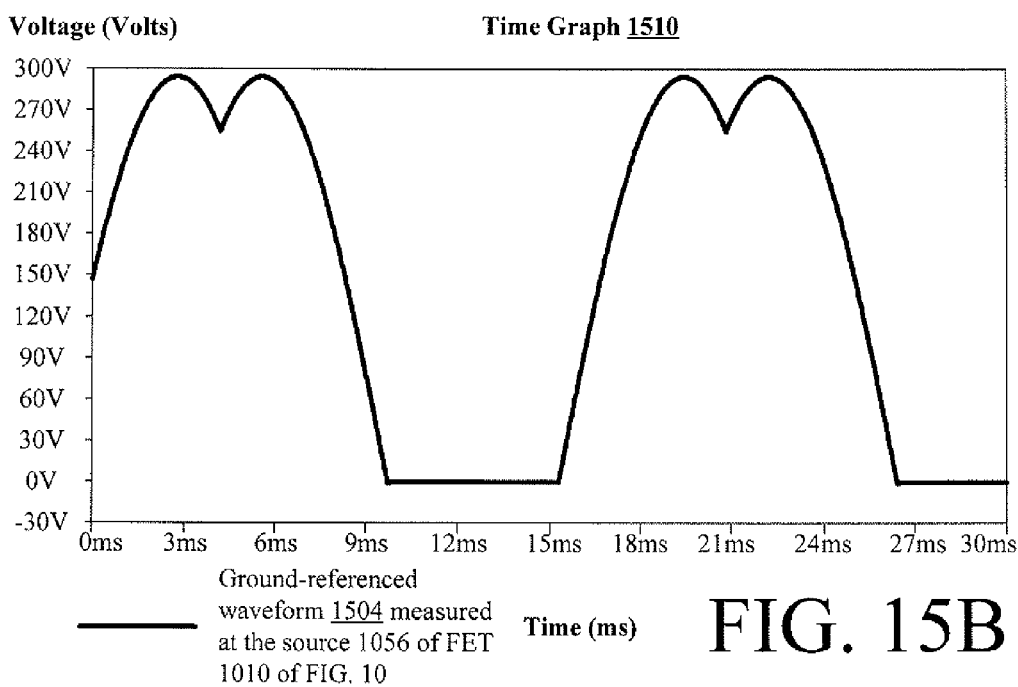
FIG. 15B is a time graph showing a first ground-referenced waveform measured at a source of a field effect transistor shown in FIG. 10.
Figure 15C:
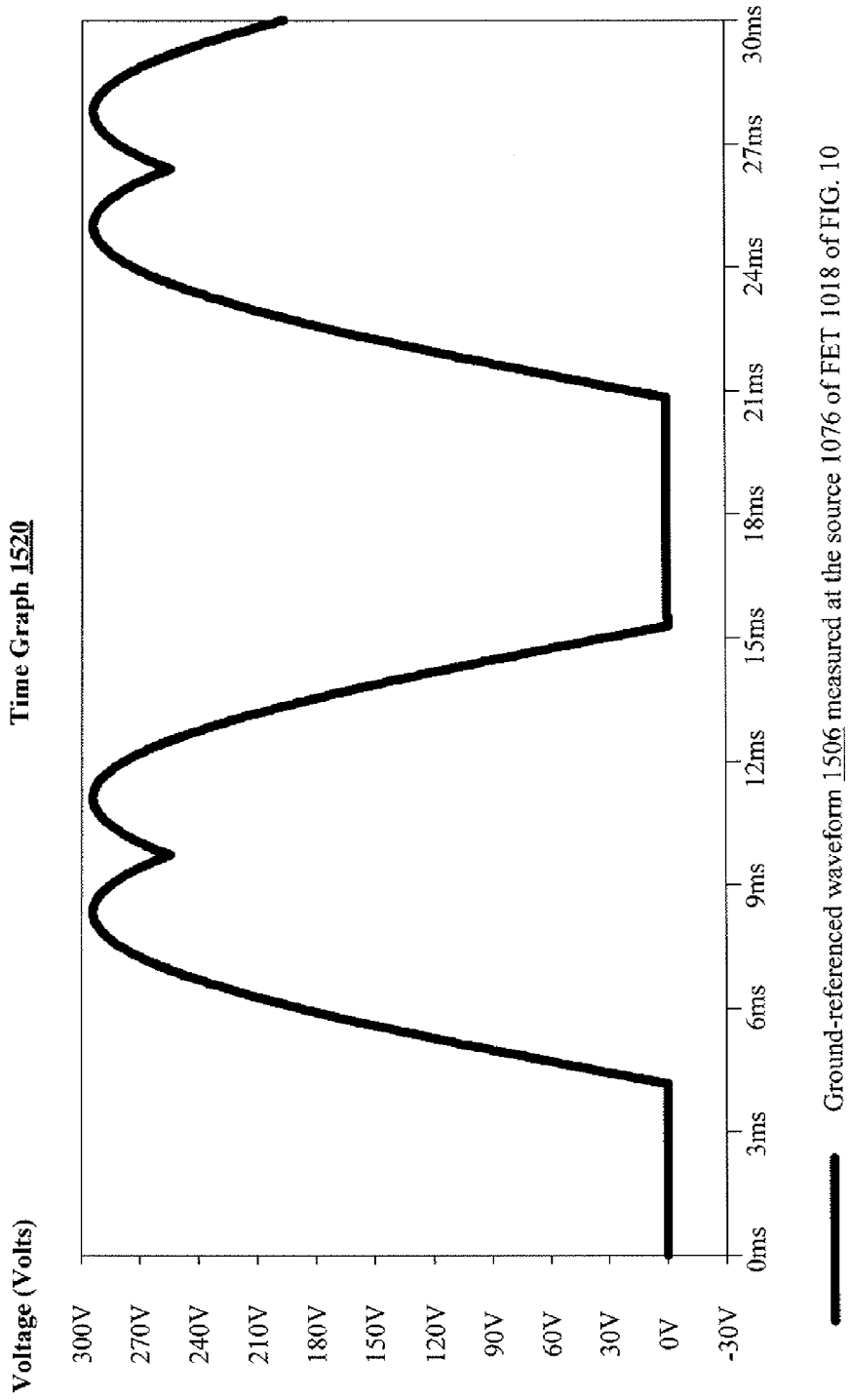
FIG. 15C is a time graph showing a first ground-referenced waveform measured at a source of a field effect transistor shown in FIG. 10.
Figure 15D:
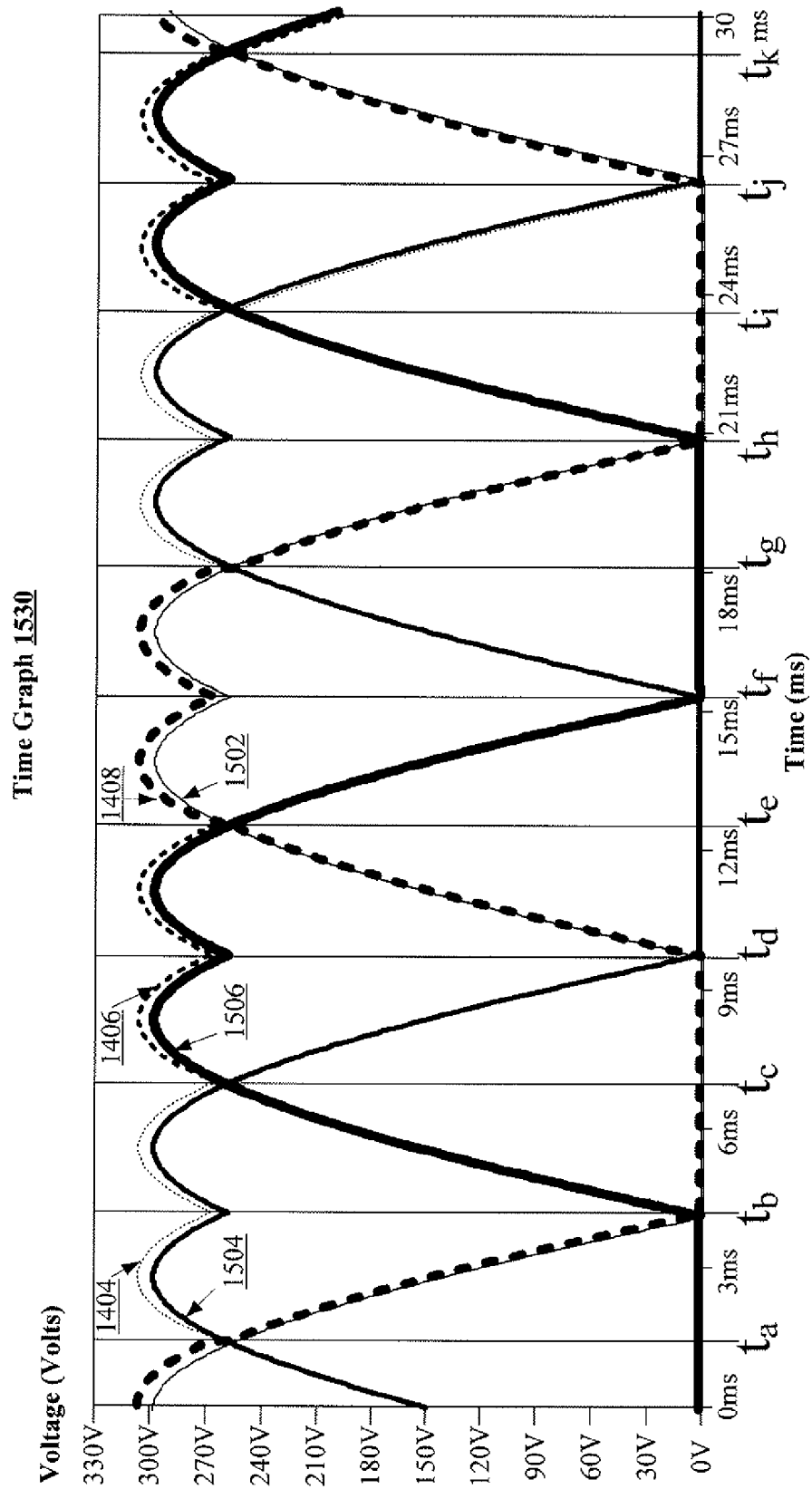
FIG. 15D is a time graph showing that a FET "on/off" state transition process is achieved with the use of the three (3) ground-referenced waveforms shown in FIGS. 15A-15C.

The FET "on/off" state transition process described above is achieved with the use of three (3) ground-referenced waveforms 1502, 1504, 1506 shown in the time graphs 1500, 1510, 1520, 1530 of FIGS. 15A-15D, the voltage divider circuits 1092/1088, 1030/1040, 1007/1096, 1050/1060, 1015/1011, 1070/1080 (shown in FIG. 10) and the diodes 1090, 1091, 1028, 1098, 1097, 1048, 1013, 1099, 1068 (shown in FIG. 10). Each of the time graphs 1500, 1510, 1520 shows a respective ground-referenced waveform 1502, 1504, 1506. It should be noted that FIG. 15D shows the ground-referenced waveform 1502, 1504, 1506 of FIGS. 15A-15C overlapping each other. FIG. 15D also shows the gate voltage waveforms 1404, 1406, 1408 of FIGS. 14B-14D overlapping each other.

As shown in FIG. 15D, the ground-referenced waveform 1502 is an input voltage waveform supplied to the circuit 1000 and measured at the source 1066 of the field effect transistor 1014. The ground-referenced waveform 1504 is an input voltage waveform supplied to the circuit 1000 and measured at the source 1056 of the field effect transistor 1010. The ground-referenced waveform 1506 is an input voltage waveform supplied to the circuit 1000 and measured at the source 1076 of the field effect transistor 1018. As noted above, the field effect transistor 1010 is switched to its "on" state at time $t_a$ and switched to its "off" state at time $t_c$. The field effect transistor 1018 is switched to its "on" state at time $t_c$ and switched to its "off" state at time $t_e$. The field effect transistor 1014 is switched to its "on" state at time $t_e$ and switched to its "off" state at time $t_g$.

As shown in FIG. 15D, time $t_a$ represents the time when a falling edge of the ground-referenced waveform 1502 intersects a rising edge of the second ground-referenced waveform 1504. Notably, the voltage divider circuit 1092/1088 and diodes 1090, 1091 of FIG. 10 collectively provide a means for indicating to the gate drive circuit 1001a when to switch the field effect transistor 1010 to its "on" state and/or "off" state. In this regard, it should be understood that the first field effect transistor 1010 does not conduct during time $t_c$-$t_e$, i.e., when the ground-referenced waveform 1506 has voltage values greater than those of the ground-referenced waveforms 1502 and 1504. It should also be understood that each of the diodes 1090, 1091 of FIG. 10 is connected electrically between a respective voltage source 202 and the terminal 1 of the gate drive circuit 1001a through resistor 1005a. The diodes 1090, 1091 are provided to ensure that the first field effect transistor 1010 does not conduct during the period of time $t_c$-$t_g$. During the period of time $t_c$-$t_g$, current is allowed to flow from the voltage sources through the diodes 1090, 1091 to the terminal 1 of the gate drive circuit 1001a through resistor 1005a. In effect, the voltage at the terminal 1 of the gate drive circuit 1001a is more positive than the reference voltage $V_{ref}$. When this occurs, the gate drive circuit 1001a supplies a voltage waveform having an "off" state value to the gate 1054 of the first field effect transistor 1010. As a result, the voltage at the gate 1054 of the first field effect transistor 1010 is below a threshold gate-to-source voltage $V_{gs\_th}$ of the field effect transistor 1010. Consequently, the field effect transistor 1010 remains in its "off" state outside the region of interest $t_a$-$t_c$. In its "off" state, the field effect transistor 1010 does not conduct, i.e., a drain-to-source current $I_{ds}$ is approximately zero (0).

The first field effect transistor 1010 is switched to its "on" state when the falling edge of the ground-referenced waveform 1502 intersects the rising edge of the second ground-referenced waveform 1504. The field effect transistor 1010 remains in its "on" state during the region of interest $t_a$-$t_c$, i.e., until the voltage values of the ground-referenced waveform 1506 are greater then the voltage values of the ground-referenced waveform 1504. During its "on" state, the voltage at the gate 1054 of the first field effect transistor 1010 is greater than the threshold gate-to-source voltage $V_{gs\_th}$ of the field effect transistor 1010. Also during its "on" state, the drain-to-source current $I_{ds}$ flows via a conducting channel that connects the drain 1052 to the source 1056 of the first field effect transistor 1010. The conductivity of the first field effect transistor 1010 is varied by the electric field that is produced when a voltage is applied between the gate 1054 and source 1056 thereof. Hence, the current flowing between the drain 1052 and source 1056 is controlled by the voltage applied between the gate 1054 and source 1056.

As also shown in FIG. 15D, time $t_c$ represents the time when a falling edge of the ground-referenced waveform 1504 intersects the rising edge of the ground-referenced waveform 1506. Notably, the voltage divider 1015/1011 and the diodes 1013, 1099 of FIG. 10 collectively provide a means for indicating to the gate drive circuit 1001c when to switch the field effect transistor 1018 to its "on" state and/or "off" state. In this regard, it should be understood that the field effect transistor 1018 does not conduct during time $t_e$-$t_g$, i.e., when the ground-referenced waveform 1502 has voltage values greater than those of the ground-referenced waveforms 1504 and 1506. It should also be understood that each of the diodes 1013, 1099 is connected electrically between a respective voltage source 202 and the terminal 1 of the gate drive circuit 1001c through resistor 1005c. The diodes 1013, 1099 are provided to ensure that the field effect transistor 1018 does not conduct during the period of time $t_e$-$t_i$. During the period of time $t_e$-$t_i$, current is allowed to flow from the voltage sources through the diodes 1013, 1099 to the terminal 1 of the respective gate drive circuit 1001c through resistor 1005c. In effect, the voltage at the terminal 1 of the gate drive circuit 1001c is more positive than the reference voltage $V_{ref}$. When this occurs, the gate drive circuit 1001a supplies a voltage waveform having an "off" state value to the gate 1074 of the field effect transistor 1018. As a result, the voltage at the gate 1074 of the field effect transistor 1018 is below a threshold gate-to-source voltage $V_{gs\_th}$ of the field effect transistor 1018. Consequently, the field effect transistor 1018 remains in its "off" state outside the region of interest $t_c$-$t_e$. In its "off" state, the field effect transistor 1018 does not conduct, i.e., a drain-to-source current $I_{ds}$ is approximately zero (0).

The field effect transistor 1018 is switched to its "on" state when the falling edge of the ground-referenced waveform 1504 intersects the rising edge of the ground-referenced waveform 1506. The field effect transistor 1018 remains in its "on" state during the region of interest $t_c$-$t_e$, i.e., until the voltage values of the ground-referenced waveform 1502 are greater that the voltage values of the ground-referenced waveform 1506. During its "on" state, the voltage at the gate 1074 of the field effect transistor 1018 is greater than the threshold gate-to-source voltage $V_{gs\_th}$ of the field effect transistor 1018. Also during its "on" state, the drain-to-source current $I_{ds}$ flows via a conducting channel that connects the drain 1072 to the source 1076 of the field effect transistor 1018. The conductivity of the field effect transistor 1018 is varied by the electric field that is produced when a voltage is applied between the gate 1074 and source 1076 thereof. Hence, the current flowing between the drain 1072 and source 1076 is controlled by the voltage applied between the gate 1074 and source 1076.

As further shown in FIG. 15D, time $t_e$ represents the time when the falling edge of the ground-referenced waveform 1506 intersects the rising edge of the ground-referenced waveform 1502. Time $t_g$ represents the time when the falling edge of the ground-referenced waveform 1502 intersects the rising edge of the ground-referenced waveform 1504. Notably, the voltage divider 1007/1096 and diodes 1098, 1097 of FIG. 10 collectively provide a means for indicating to the gate drive circuit 1001b when to switch the field effect transistor 1014 to its "on" state and/or "off" state. In this regard, it should be understood that the field effect transistor 1014 does not conduct during the period of time $t_g$-$t_i$, i.e., when the ground-referenced waveform 1504 has voltage values greater than those of ground-referenced waveforms 1502 and 1506. It should also be understood that each of the diodes 1098, 1097 is connected electrically between a respective voltage source 202 and the terminal 1 of the gate drive circuit 1001b through a resistor 1005b. The diodes 1098, 1097 are provided to ensure that the field effect transistor 1014 does not conduct during period of time $t_g$-$t_k$. During the period of time $t_g$-$t_k$, current is allowed to flow from the voltage sources through the diodes 1098, 1097 to the terminal 1 of the gate drive circuit 1001b through a resistor 1005b. In effect, the voltage at the terminal 1 of the gate drive circuit 1001b is more positive than the reference voltage $V_{ref}$. When this occurs, the gate drive circuit 1001b supplies a voltage waveform having an "off" state value to the gate 1064 of the field effect transistor 1014. As a result, the voltage at the gate 1064 of the field effect transistor 1014 is below a threshold gate-to-source voltage $V_{gs\_th}$ of the field effect transistor 1014. Consequently, the third field effect transistor 1014 remains in its "off" state outside the region of interest $t_e$-$t_g$. In its "off" state, the field effect transistor 1014 does not conduct, i.e., a drain-to-source current $I_{ds}$ is approximately zero (0).

The field effect transistor 1014 is switched to its "on" state when the falling edge of the ground-referenced waveform 1506 intersects the rising edge of the ground-referenced waveform 1502. The field effect transistor 1014 remains in its "on" state during the region of interest $t_e$-$t_g$, i.e., until the voltage values of the ground-referenced waveform 1504 exceed the voltage values of the ground-referenced waveform 1502. During its "on" state, the voltage at the gate 1064 of the field effect transistor 1014 is greater than the threshold gate-to-source voltage $V_{gs\_th}$ of the field effect transistor 1014. Also during its "on" state, the drain-to-source current $I_{ds}$ flows via a conducting channel that connects the drain 1062 to the source 1066 of the field effect transistor 1014. The conductivity of the field effect transistor 1014 is varied by the electric field that is produced when a voltage is applied between the gate 1064 and source 1066 thereof. Hence, the current flowing between the drain 1062 and source 1066 is controlled by the voltage applied between the gate 1064 and source 1066.

Although not shown in FIG. 15D, it should be understood that the field effect transistors 1012, 1016, 1020 are switched to their "on" states when a gate-to-source voltage $V_{gs}$ is greater than a threshold gate-to-source voltage $V_{gs\_th}$. It should also be understood that the field effect transistor 1016 is switched to its "on" state when the falling edge of the ground-referenced waveform 1502 intersects the rising edge of the ground-referenced waveform 1506, i.e., at time $t_b$ shown in FIG. 12G. The field effect transistor 1016 remains in its "on" state during the region of interest $t_b$-$t_d$, i.e., until the voltage values of the ground-referenced waveform 1502 exceed the voltage values of the ground-referenced waveform 1504. Likewise, the field effect transistor 1012 is switched to its "on" state when the falling edge of the ground-referenced waveform 1504 intersects the rising edge of the ground-referenced waveform 1502, i.e., at time $t_d$ shown in FIG. 12G. The field effect transistor 1012 remains in its "on" state during the region of interest $t_d$-$t_f$, i.e., until the voltage values of the ground-referenced waveform 1504 exceed the voltage values of the ground-referenced waveform 1506. Similarly, the field effect transistor 1020 is switched to its "on" state when the falling edge of the ground-referenced waveform 1506 intersects the rising edge of the ground-referenced waveform 1504, i.e., at time $t_f$ shown in FIG. 12G. The field effect transistor 1020 remains in its "on" state during the region of interest $t_f$-$t_h$, i.e., until the voltage values of the ground-referenced waveform 1506 exceed the voltage values of the ground-referenced waveform 1502.

When a field effect transistor 1010, 1012, 1014, 1016, 1018, 1020 is switched to its "on" state, a relatively low resistance path is created between a drain 1052, 1026, 1062, 1036, 1072, 1046 and source 1056, 1022, 1066, 1032, 1076, 1042 thereof. The exact amount of this resistance will depend upon several factors, including the specified drain-source "on" state resistance of the field effect transistors 1010, 1012, 1014, 1016, 1018, 1020. For example, "on" state resistance values of between half a milli Ohm (0.5 mΩ) and ten Ohms (10Ω) are typical for such devices. Once turned on, however, current will continue to flow between the drain 1052, 1026, 1062, 1036, 1072, 1046 and source 1056, 1022, 1066, 1032, 1076, 1042 of the field effect transistor 1010, 1012, 1014, 1016, 1018, 1020 through the low resistance path, thereby eliminating a voltage drop associated with a body diode 308 thereof. Consequently, if the load 1009 is connected across output lines 1059, 1057, then the voltage drop caused by the field effect transistors 1010, 1012, 1014, 1016, 1018, 1020 of circuit 1000 can be considerably less than the typical diode drop associated with a conventional three-phase diode bridge rectifier circuit (such as circuit 1700 shown in FIG. 17).

If an AC input voltage applied on an input line 1051, 1053, 1055 is sufficiently high, it will exceed a reverse breakdown voltage of an optional zener diode 1032, 1031, 1034, 1033, 1036, 1035 associated with the field effect transistor 1010, 1012, 1014, 1016, 1018, 1020. This will cause the optional zener diode 1032, 1031, 1034, 1033, 1036, 1035 to clamp the voltage applied to terminal 1 of the gate drive circuits.

Figure 16A:
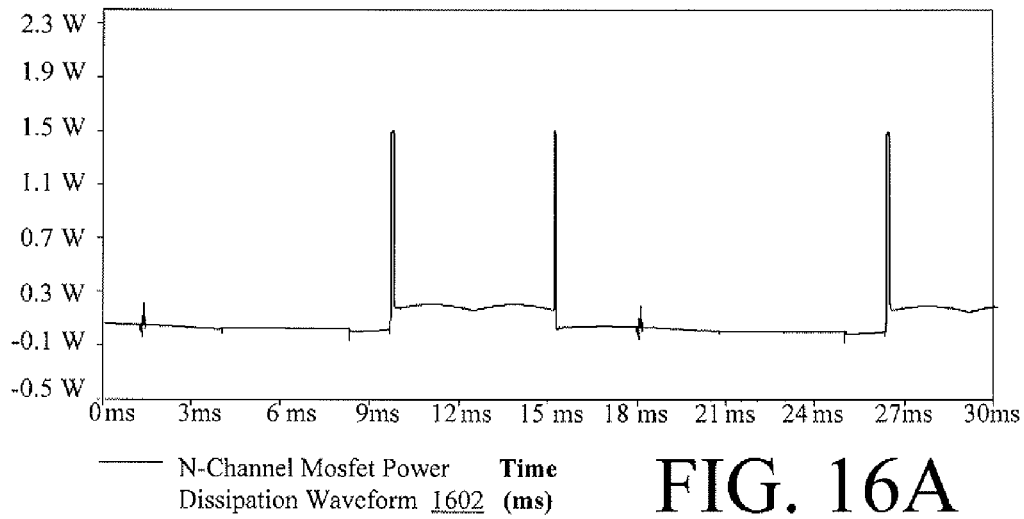
FIG. 16A is a time graph showing a power dissipation waveform for an N-channel MOSFET of FIG. 10.
Figure 16B:
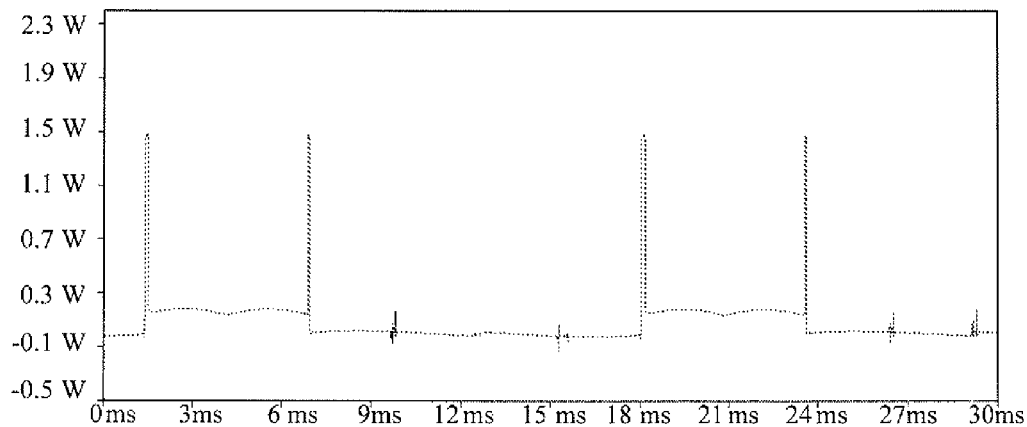
FIG. 16B is a time graph showing a power dissipation waveform for an N-channel MOSFET of FIG. 10.
Figure 16C:
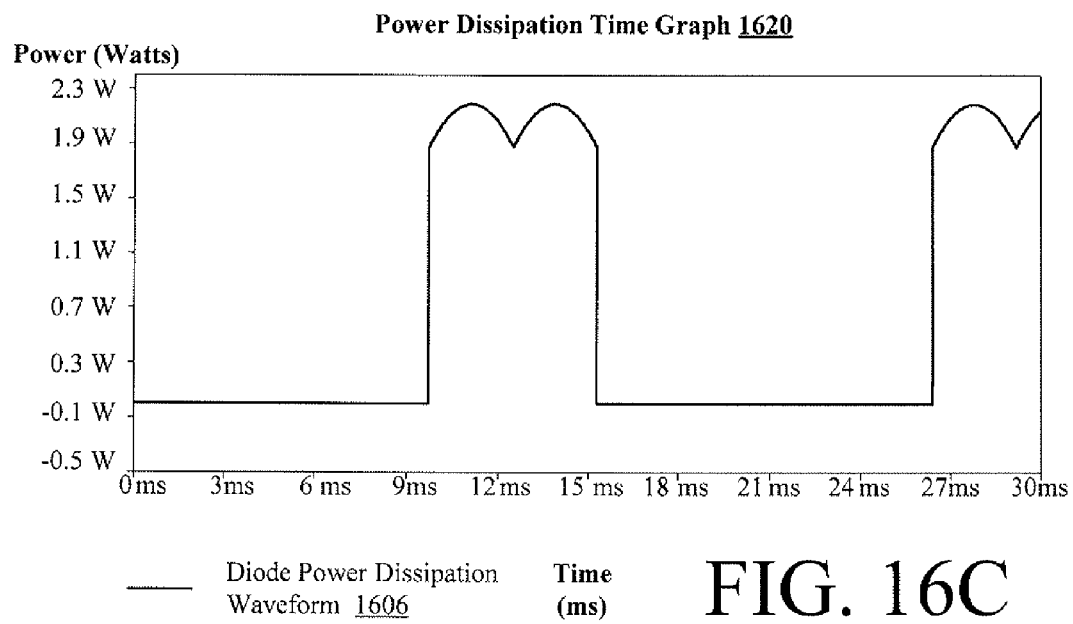
FIG. 16C is a time graph showing that a power dissipation waveform for a diode of a conventional three-phase bridge rectifier circuit.
Figure 16D:
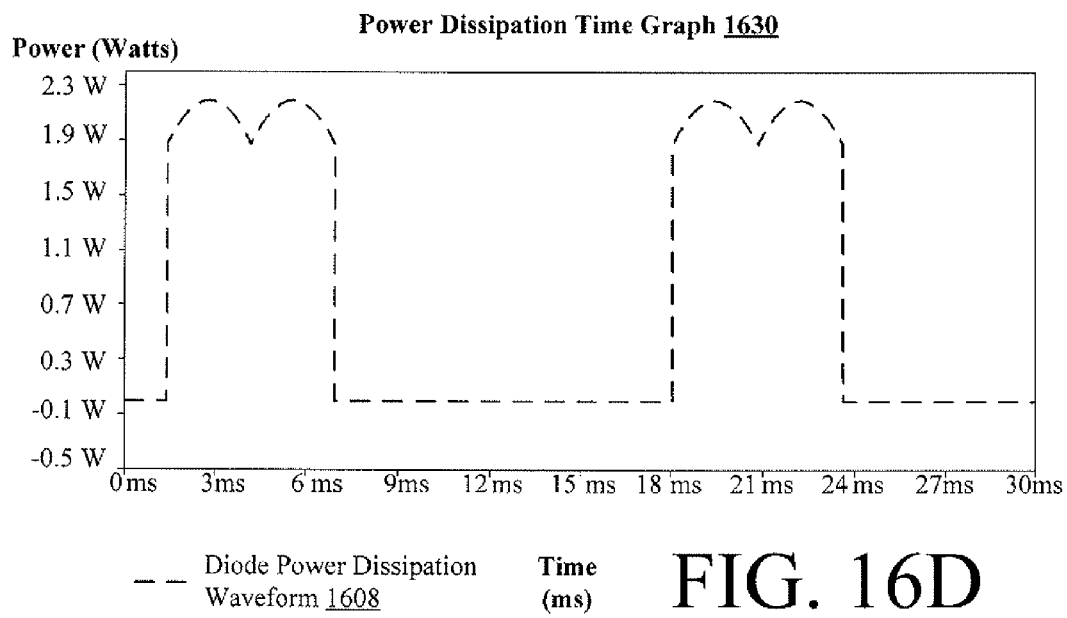
FIG. 16D is a time graph showing that a power dissipation waveform for a diode of a conventional three-phase bridge rectifier circuit.
Figure 16E:
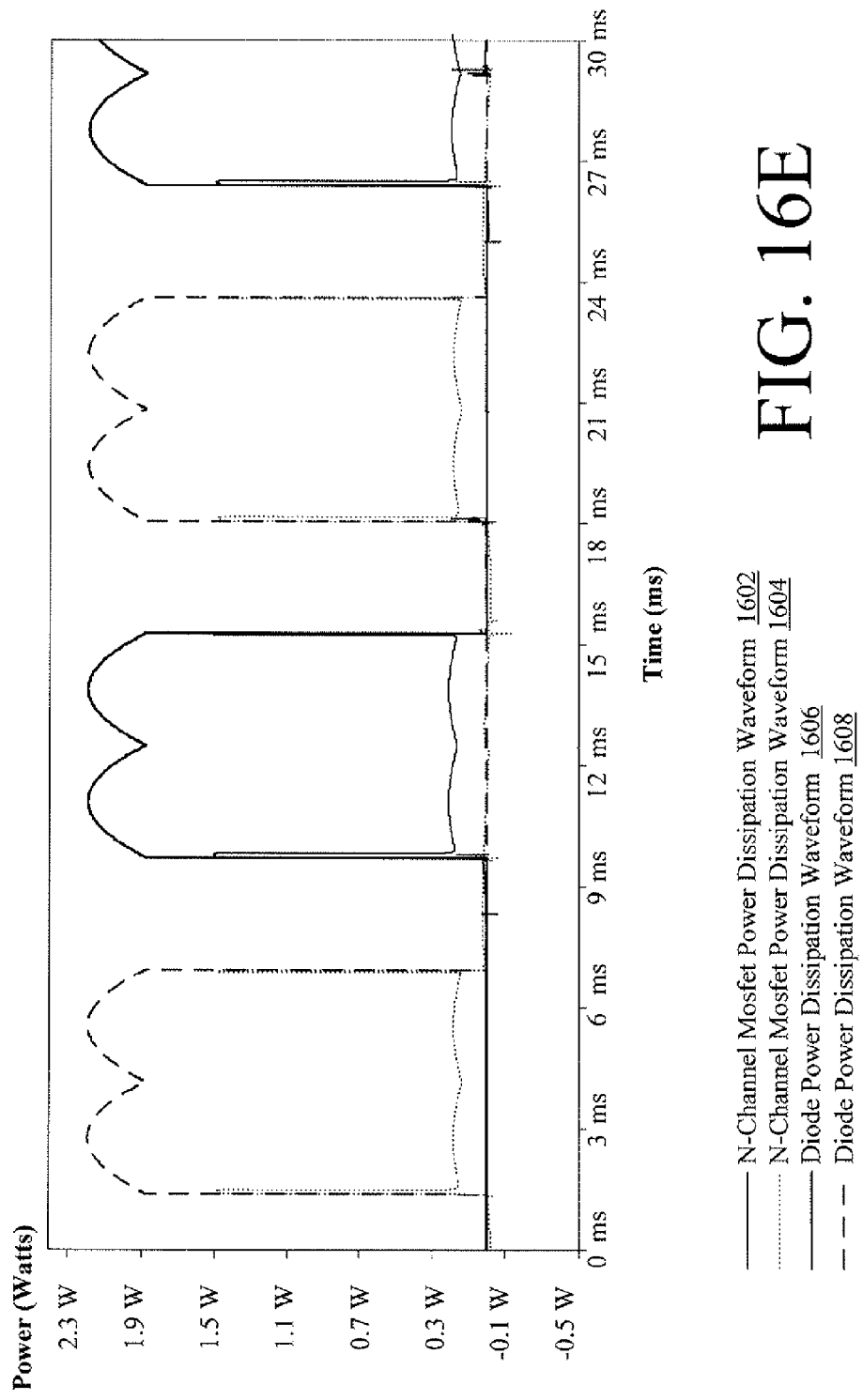
FIG. 16E is a time graph showing the power dissipation waveforms of FIGS. 16A-16D overlapping each other.
Figure 17:
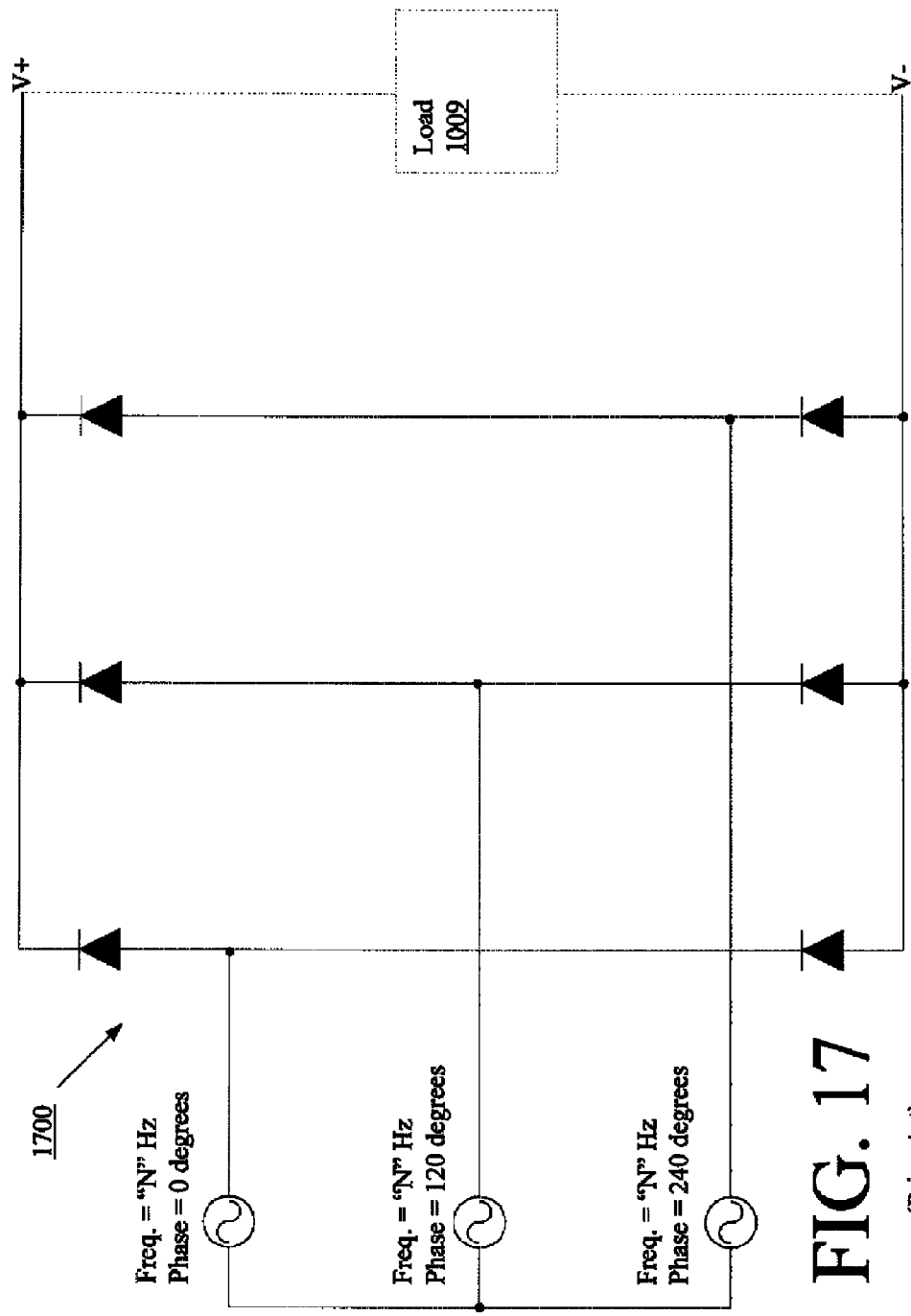
FIG. 17 is a schematic illustration of a conventional three-phase diode bridge rectifier circuit.

Referring now to FIGS. 16A-16E, there are provided a power dissipation time graphs 1600, 1610, 1620, 1630, 1640 that are useful for understanding certain advantages of the present invention. Each of the time graphs 1600, 1610, 1620, 1630 shows a respective power dissipation waveform 1602, 1604, 1606, 1608. It should be noted that FIG. 16E shows the waveforms 1602, 1604, 1606, 1608 of FIGS. 16A-16D overlapping each other. As shown in FIGS. 16A-16E, the first power dissipation waveform 1602 represents power dissipated in a first field effect transistor of the circuit 1000 with a load 1009 connected thereto. The second power dissipation waveform 1604 represents power dissipated in a second field effect transistor of the circuit 1000 with the load 1009 connected thereto. Each of the third and fourth power dissipation waveforms 1606, 1608 represents power dissipated in a diode of a conventional three-phase bridge rectifier circuit 1700 with the load 1009 connected thereto as shown in FIG. 17.

As evidenced by the power dissipation time graph 1640 of FIG. 16E, the amount of power dissipated in the field effect transistors of circuit 1000 is substantially less than the power dissipated in the diodes of the conventional three-phase bridge rectifier circuit 1700. For example, the power dissipated in the field effect transistors of circuit 1000 can be reduced by seventy-five percent or more (>75%) as compared to the power dissipated in the diodes of the conventional three-phase bridge rectifier circuit 1700. Notably, circuit 1000 can be modified so as to decrease the amount of power dissipated in the field effect transistors than that shown in FIG. 16E. For example, the power dissipated in circuit 1000 can be further reduced if one or more field effect transistors are connected in parallel with the field effect transistors 1010, 1012, 1014, 1016, 1018, 1020. The power dissipated in circuit 1000 can also be further reduced if field effect transistors with relatively low drain-to-source "on" state resistances $R_{DSon}$ are employed.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

We claim:

1. An n-phase transistor active bridge circuit connectable between at least two input lines and a pair of output lines, said n-phase transistor active bridge circuit comprising:
   first and second field-effect transistors, a source-drain path of said first field-effect transistor connected in series with a source-drain path of said second field-effect transistor to form a first series transistor combination;
   third and fourth field-effect transistors, a source-drain path of said third field-effect transistor connected in series with a source-drain path of said fourth field-effect transistor to form a second series transistor combination;
   said first, second, third and fourth field-effect transistors connected to convert an n-phase AC waveform to a DC waveform, said n-phase AC waveform applied to said n-phase transistor active bridge circuit by at least one voltage source coupled to said input lines; and
   a plurality of gate drive circuits configured to sense a voltage across said input lines and supply a voltage to gates of said first, second, third and fourth field-effect transistors to switch said field-effect transistors to their "on" states or "off" states at predetermined times determined based on said sensed voltage, each of said plurality of gate drive circuits has a first terminal directly connected to a respective one of a plurality of voltage taps provided by a plurality of voltage divider circuits and a second terminal directly connected to a gate of said respective one of said field-effect transistors;

wherein the first, second, third and fourth field effect transistors are of the same channel type.

2. The n-phase transistor active bridge circuit according to claim 1, further comprising a fifth and sixth field effect transistor, a source-drain path of said fifth field-effect transistor connected in series with a source-drain path of said sixth field-effect transistor to form a third series transistor combination, wherein said fifth and sixth field effect transistors are of the same channel type as the first, second, third and fourth field effect transistors.

3. The n-phase transistor active bridge circuit according to claim 2, wherein said plurality of gate drive circuits is further configured to supply a voltage to gates of said fifth and sixth field effect transistors to switch said field-effect transistors to their "on" states or "off" states at predetermined times.

4. The n-phase transistor active bridge circuit according to claim 1, wherein at least one of said plurality of voltage divider circuits comprises a first resistor connected between a third terminal of a respective gate drive circuit of said plurality of gate drive circuits and said first terminal of said respective gate drive circuit, and a second resistor connected in series with said first resistor from said third terminal of said respective gate drive circuit directly to a first input line of said input lines.

5. The n-phase transistor active bridge circuit according to claim 1, wherein at least one of said plurality of voltage divider circuits comprises a first resistor connected between a source of a respective one of said field effect transistors and said first terminal of said respective gate drive circuit, and a second resistor connected in series with said first resistor from said first terminal of said respective gate drive circuit directly to a first input line of said input lines.

6. The n-phase transistor active bridge circuit according to claim 1, wherein at least one of said plurality of voltage divider circuits comprises a first resistor connected between a first output line of said output lines and said first terminal of said respective gate drive circuit, and a second resistor connected in series with said first resistor from said first terminal of said respective gate drive circuit directly to a first input line of said input lines.

7. The n-phase transistor active bridge circuit according to claim 1, wherein each voltage tap of said plurality of voltage taps is defined at a connection point between first and second resistors of a respective one of said plurality of voltage divider circuits.

8. The n-phase transistor active bridge circuit according to claim 1, wherein a first input line of said input lines has a first voltage polarity opposite a second voltage polarity of a second input line of said input lines, said first input line directly coupled to a source of said first field-effect transistor and a drain of said third field effect transistor, and said second input line directly coupled to a source of said second field effect transistor and a drain of said fourth field effect transistor.

9. The n-phase transistor active bridge circuit according to claim 2, wherein a first input line of said input lines is directly coupled to a source of said first field effect transistor and a drain of said second field effect transistor, a second input line of said input lines is directly coupled to a source of a source of said third field effect transistor and a drain of said fourth field effect transistor, and a third input line of said input lines is directly coupled to a source of said fifth field effect transistor and a drain of said sixth field effect transistor.

10. The n-phase transistor active bridge circuit according to claim 1, wherein each of said plurality of gate drive circuits includes a level detector circuit configured to provide a gate control output signal for each said field-effect transistor to selectively switch said field-effect transistor between said "on" state and said "off" state.

11. The n-phase transistor active bridge circuit according to claim 10, wherein said level detector circuit includes a comparator.

12. The n-phase transistor active bridge circuit according to claim 10, wherein each of said plurality of gate drive circuits further includes a resistor connected between an output terminal of said level detector circuit and a positive power supply terminal of said level detector circuit.

13. The n-phase transistor active bridge circuit according to claim 10, wherein each of said plurality of gate drive circuits includes a gate driver device configured to be excited by said level detector circuit and configured to drive said field-effect transistor by supplying a voltage having an "on state" voltage value to said gate of said field-effect transistor.

14. The n-phase transistor active bridge circuit according to claim 13, wherein said gate driver device is a buffer amplifier.

15. The n-phase transistor active bridge circuit according to claim 1, further comprising a plurality of voltage clamping devices.

16. The n-phase transistor active bridge circuit according to claim 15, wherein at least one of said voltage clamping devices is connected between said first terminal of a respective one of said plurality of gate drive circuits and a third terminal of said respective one of said plurality of gate drive circuits.

17. The n-phase transistor active bridge circuit according to claim 15, wherein at least one of said voltage clamping devices is connected between a source of said respective one of said field effect transistors and said first terminal of a respective one of said plurality of gate drive circuits.

18. The n-phase transistor active bridge circuit according to claim 15, wherein each of said voltage clamping devices is configured to provide protection to a respective one said plurality of gate drive circuits, and to permit a desired voltage level to be developed at said first terminal of said respective one said plurality of gate drive circuits when a voltage across said input lines is less than a predetermined value.

19. The n-phase transistor active bridge circuit according to claim 15, wherein each of said voltage clamping devices is a zener diode.

20. The n-phase transistor active bridge circuit according to claim 1, wherein said pair of output lines further comprises a first output line connected to said first series combination at an interconnection point between said first and said second field-effect transistors, and a second output line connected to said second series combination at an interconnection point between said third and fourth field-effect transistors.

21. The n-phase transistor active bridge circuit according to claim 2, wherein said pair of output lines further comprises a first output line connected to drains of said first, third and fifth field effect transistors, and a second output line connected to sources of said second, fourth and sixth field effect transistors.

22. The n-phase transistor active bridge circuit according to claim 1, wherein each of said field effect transistors is an N-channel MOSFET.

23. The n-phase transistor active bridge circuit according to claim 1, wherein at least a first one of said plurality of gate drive circuits further comprises a third terminal directly connected to a respective one of said input lines.

24. The n-phase transistor active bridge circuit according to claim 1, wherein at least one of said plurality of gate drive circuits further comprises a third terminal directly connected to said first series combination at an interconnection point between said first and second field effect transistors.

25. The n-phase transistor active bridge circuit according to claim 1, wherein at least one of said plurality of gate drive circuits further comprises a third terminal directly connected to said second series combination at an interconnection point between said third and fourth field effect transistors.

26. The n-phase transistor active bridge circuit according to claim 2, wherein at least one of said plurality of gate drive circuits further comprises a third terminal directly connected to said third series combination at an interconnection point between said fifth and sixth field effect transistors.

27. The n-phase transistor active bridge circuit according to claim 2, further comprising a plurality of diodes, each connected between said first terminal of a first respective one of said plurality of gate drive circuits and a third terminal of a second respective one of said plurality of gate drive circuits.

28. The n-phase transistor active bridge circuit according to claim 2, further comprising a plurality of diodes, each connected between said first terminal of a respective one of said plurality of gate drive circuits and a respective input line of said input lines.

* * * * *